United States Patent
Hsu et al.

(10) Patent No.: US 8,842,375 B1
(45) Date of Patent: Sep. 23, 2014

(54) IMAGE CAPTURING SYSTEM

(71) Applicant: Largan Precision Co., Ltd., Taichung (TW)

(72) Inventors: Po-Lun Hsu, Taichung (TW); Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 59 days.

(21) Appl. No.: 13/854,553

(22) Filed: Apr. 1, 2013

(30) Foreign Application Priority Data

Mar. 5, 2013 (TW) .............................. 102107602 A

(51) Int. Cl.
*G02B 9/60* (2006.01)
*G02B 13/18* (2006.01)
*G02B 13/00* (2006.01)

(52) U.S. Cl.
CPC .............. *G02B 9/60* (2013.01); *G02B 13/0045* (2013.01); *G02B 13/001* (2013.01)
USPC .......................................... 359/714; 359/764

(58) Field of Classification Search
CPC ................................ G02B 9/60; G02B 13/001
USPC .................... 359/714, 763, 764, 766
See application file for complete search history.

(56) References Cited

U.S. PATENT DOCUMENTS

| 8,169,528 B2 | 5/2012 | Chen et al. |
| 8,233,224 B2 | 7/2012 | Chen |
| 2013/0114151 A1* | 5/2013 | Chen et al. ..................... 359/714 |
| 2013/0201568 A1* | 8/2013 | Tsai et al. ...................... 359/714 |
| 2014/0126073 A1* | 5/2014 | Tsai et al. ...................... 359/764 |
| 2014/0177076 A1* | 6/2014 | Hsu et al. ...................... 359/714 |

* cited by examiner

*Primary Examiner* — Darryl J Collins
(74) *Attorney, Agent, or Firm* — Morris Manning & Martin LLP; Tim Tingkang Xia, Esq.

(57) ABSTRACT

An image capturing system includes, in order from an object side to an image side, a first lens element, a second lens element, a third lens element, a fourth lens element and a fifth lens element. The first lens element with positive refractive power has a convex object-side surface at a paraxial region. The second lens element and the third lens element have refractive power. The fourth lens element with negative refractive power has a concave object-side surface at a paraxial region and a convex image-side surface at a paraxial region. The fifth lens element with refractive power has an image-side surface, wherein the image-side surface changes from concave at a paraxial region to convex at a peripheral region, and an object-side surface and the image-side surface of the fifth lens element are aspheric. The image capturing system has a total of five lens elements with refractive power.

21 Claims, 21 Drawing Sheets

IMAGE CAPTURING SYSTEM

RELATED APPLICATIONS

The application claims priority to Taiwan Application Serial Number TW 102107602, filed on Mar. 5, 2013, which is herein incorporated by reference.

BACKGROUND

1. Technical Field

The present disclosure relates to an image capturing system. More particularly, the present disclosure relates to a compact image capturing system applicable to electronic products.

2. Description of Related Art

In recent years, with the rapid development of consumer electronics, there is an ever increasing need to keep the products as compact as possible, and accordingly, the internal product components are required to have their size minimized so as to make the whole product more compact and portable. Also, as the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure such as the one disclosed in the U.S. Pat. No. 8,169,528. Due to the popularity of mobile products with high-end specifications, such as smart phones and PDAs (Personal Digital Assistants), the requirements for high resolution and image quality of modern compact optical lens systems increases significantly. However, the conventional four-element lens structure cannot satisfy these requirements of the compact optical lens system.

Other conventional compact optical lens systems with five-element lens structure such as the one disclosed in the U.S. Pat. No. 8,233,224 has a longer total track length and the axial distances between lens elements has no space for other mechanical components, such as shutter. It is thereby not favorable for correcting the astigmatism and coma, and the image quality cannot be effectively improved.

Inasmuch as the foregoing, it has become an important issue in the Optics to keep the optical lens systems compact while including other mechanical components for achieving better image quality. Accordingly, a need exists in the art for providing an optical lens system that has a compact size and excellent imaging quality while containing spaces for other mechanical components.

SUMMARY

According to one aspect of the present disclosure, an image capturing system includes, in order from an object side to an image side, a first lens element, a second lens element, a third lens element, a fourth lens element and a fifth lens element. The first lens element with positive refractive power has a convex object-side surface at a paraxial region. The second lens element has refractive power. The third lens element has refractive power. The fourth lens element with negative refractive power has a concave object-side surface at a paraxial region and a convex image-side surface at a paraxial region. The fifth lens element with refractive power has a concave image-side surface at a paraxial region, wherein the shape of the image-side surface of the fifth lens element changes from concave at the paraxial region to convex at a peripheral region, and an object-side surface and the image-side surface of the fifth lens element are aspheric. The image capturing system has a total of five lens elements with refractive power. When an axial distance between the first lens element and the second lens element is T12, a central thickness of the second lens element is CT2, an axial distance between the third lens element and the fourth lens element is T34, a focal length of the fourth lens element is f4, and a focal length of the fifth lens element is f5, the following relationships are satisfied:

$1.08 < T12/CT2 < 3.0;$ $1.08 < T12/T34 < 3.0;$ and $0 < |f4/f5| < 0.50.$

According to another aspect of the present disclosure, an image capturing system includes, in order from an object side to an image side, a first lens element, a second lens element, a third lens element, a fourth lens element and a fifth lens element. The first lens element with positive refractive power has a convex object-side surface at a paraxial region. The second lens element has refractive power. The third lens element has refractive power. The fourth lens element with negative refractive power has a concave object-side surface at a paraxial region and a convex image-side surface at a paraxial region. The fifth lens element with refractive power has a concave image-side surface at a paraxial region, wherein the shape of the image-side surface of the fifth lens element changes from concave at the paraxial region to convex at a peripheral region, and an object-side surface and the image-side surface of the fifth lens element are aspheric. The image capturing system has a total of five lens elements with refractive power. When an axial distance between the first lens element and the second lens element is T12, a central thickness of the second lens element is CT2, an axial distance between the third lens element and the fourth lens element is T34, a focal length of the fourth lens element is f4, a focal length of the fifth lens element is f5, a distance in parallel with an optical axis from a maximum effective diameter position on the image-side surface of the fourth lens element to an axial vertex on the image-side surface of the fourth lens element is SAG42, and a central thickness of the fourth lens element is CT4, the following relationships are satisfied:

$1.08 < T12/CT2 < 3.0;$ $0.85 < T12/T34 < 3.0;$ $0 < |f4/f5| < 0.50;$ and $0.6 < |SAG42/CT4| < 1.3.$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
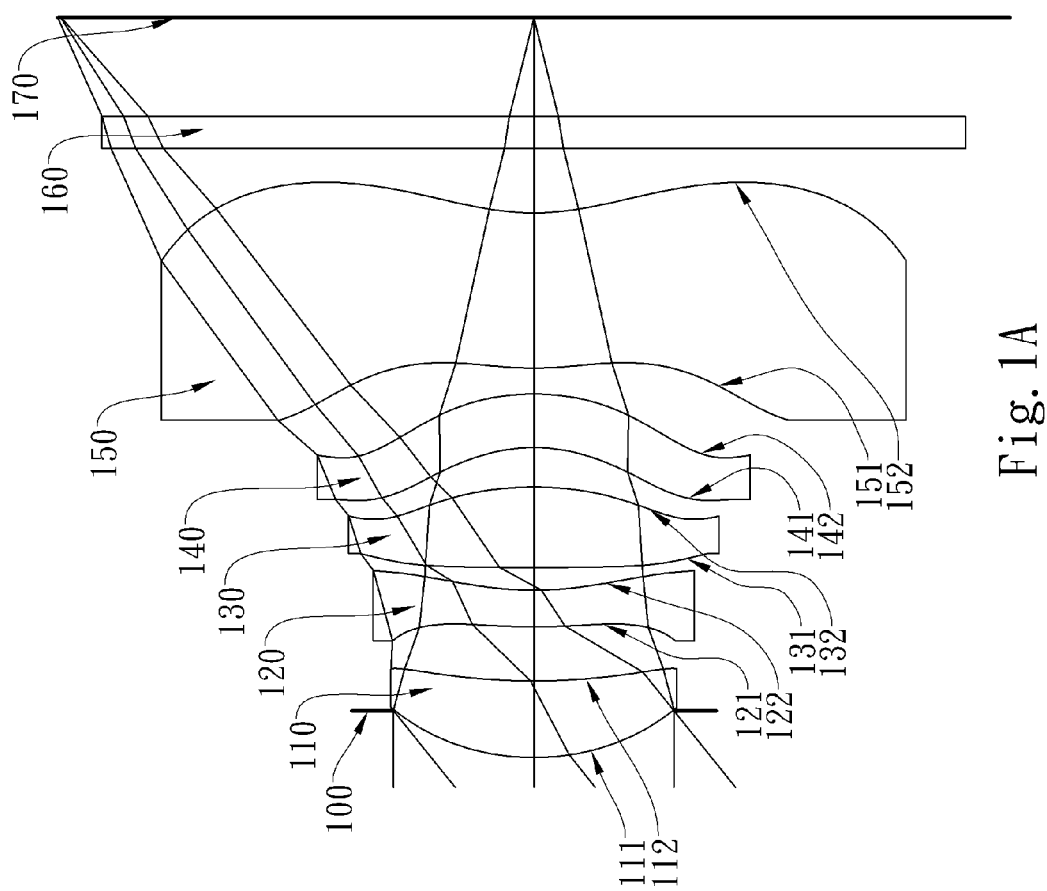
FIG. 1A is a schematic view of an image capturing system according to the 1st embodiment of the present disclosure.

An image capturing system includes, in order from an object side to an image side, a first lens element, a second lens element, a third lens element, a fourth lens element and a fifth lens element, wherein the image capturing system has a total of five lens elements with refractive power.

The first lens element has positive refractive power, so that it provides the image capturing system with the positive refractive power as it needs to be so as to reduce the total track length. Moreover, the first lens element has a convex object-side surface at a paraxial region, so that it is favorable for effectively reduce the total track length. The first lens element can have a concave image-side surface at a paraxial region, so that it is favorable for correcting the astigmatism.

The second lens element can have negative refractive power, so that it is favorable for correcting the aberration generated from the first lens element. The second lens element can have a convex object-side surface at a paraxial region and a concave image-side surface at a paraxial region. Therefore, it is favorable for effectively correcting the astigmatism. Furthermore, the shape of the object-side surface of the second lens element can change from convex at the paraxial region to concave at a peripheral region. Therefore, it is favorable for reducing the angle at which the incident light projects onto an image sensor from the off-axis so as to improve the image-sensing efficiency of the image sensor, and it is also favorable for correcting the aberration of the off-axis.

The third lens element can have positive refractive power, so that it is favorable for reducing the system sensitivity and the spherical aberration. The third lens element can have a convex image-side surface at a paraxial region, so that it is favorable for effectively reducing the system sensitivity.

The fourth lens element with negative refractive power is favorable for effectively correcting the Petzval Sum of the image capturing system so as to form a more flat image plane. The fourth lens element has a concave object-side surface at a paraxial region and a convex image-side surface at a paraxial region, so that the astigmatism of the image capturing system can be effectively corrected so as to improve image quality.

The fifth lens element can have a convex object-side surface at a paraxial and a concave image-side surface at a paraxial region, so that the astigmatism of the image capturing system can be corrected. Furthermore, the shape of the image-side surface of the fifth lens element changes from concave at the paraxial region to convex at a peripheral region. Therefore, it is favorable for reducing the angle at which the incident light projects onto the image sensor from the off-axis so as to enhance the image-sensing efficiency of the image sensor, and it is also favorable for correcting the aberration of the off-axis.

When an axial distance between the first lens element and the second lens element is T12, and a central thickness of the second lens element is CT2, the following relationship is satisfied: $1.08<T12/CT2<3.0$. It is favorable for effectively enlarging the axial space between the first lens element and the second lens element so as to have space arranging for other mechanical components. It is also favorable for control the amount of the light exposure, the length of exposure time, or the filter. Preferably, the following relationship is satisfied: $1.2<T12/CT2<2.0$.

When the axial distance between the first lens element and the second lens element is T12, and an axial distance between the third lens element and the fourth lens element is T34, the following relationship is satisfied: $1.08<T12/T34<3.0$. It is favorable for assembling the lens elements of the image capturing system so as to increase the manufacturing yield rate. Preferably, the following relationship is satisfied: $0.85<T12/T34<3.0$.

When a focal length of the fourth lens element is f4, and a focal length of the fifth lens element is f5, the following relationship is satisfied: $0<|f4/f5|<0.50$. Therefore, the arrangement of the refractive power between the fourth lens element and the fifth lens element will be more balanced for effectively correcting the aberration so as to improve the resolving power of the system.

When a distance in parallel with an optical axis from a maximum effective diameter position on the image-side surface of the fourth lens element to an axial vertex on the image-side surface of the fourth lens element is SAG42 (When the distance towards the object side of the image capturing system is negative, and when the distance towards the image side of the image capturing system is positive.), and a central thickness of the fourth lens element is CT4, the following relationship is satisfied: $0.6<|SAG42/CT4|<1.3$.

Therefore, the surface shape of the fourth lens element will not be too curvy and the thickness of the fourth lens element will also be proper. It is also favorable for manufacturing and shaping the lens elements, and reducing the required space for assembling the lens elements so as to keep the lens elements more compact.

When a focal length of the image capturing system is f, and a focal length of the third lens element is f3, the following relationship is satisfied: $0.7<f/f3<1.7$. It is favorable for reducing the system sensitivity and the spherical aberration.

When a curvature radius of the object-side surface of the third lens element is R5, and a curvature radius of the image-side surface of the third lens element is R6, the following relationship is satisfied: $0.5<(R5+R6)/(R5-R6)<2.0$. It is favorable for reducing the spherical aberration.

When the curvature radius of the image-side surface of the fourth lens element is R8, and a focal length of the fourth lens element is f4, the following relationship is satisfied: $0<R8/f4<0.8$. It is favorable for correcting the aberration so as to improve image quality.

When an axial distance between the second lens element and the third lens element is T23, the axial distance between the third lens element and the fourth lens element is T34, an axial distance between the fourth lens element and the fifth lens element is T45, and a central thickness of the fifth lens element is CT5, the following relationship is satisfied: $0.30<(T23+T34+T45)/CT5<0.85$. It thereby avoids the lens elements from being deformed and is favorable for assembling the lens elements so as to increase the manufacturing yield rate.

When an Abbe number of the second lens element is V2, an Abbe number of the fourth lens element is V4, and an Abbe number of the first lens element is V1, the following relationship is satisfied: $0.6<(V2+V4)/V1<1.0$. It is favorable for correcting the chromatic aberration.

Figure 11:
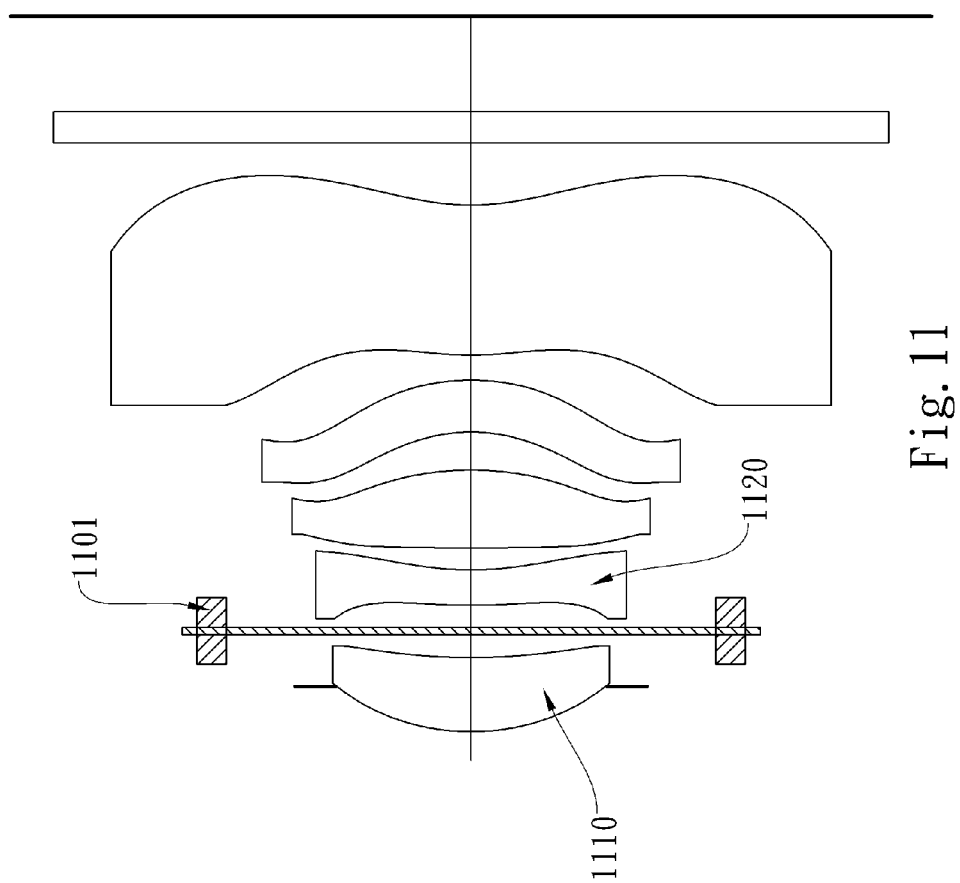
FIG. 11 is a schematic view of the shutter (or other mechanical components) disposed between the first lens element and the second lens element.

Please refer to FIG. 11, the axial distance between the first lens element 1110 and the second lens element 1120 will be effectively enlarged under the arrangement of the present disclosure. Accordingly, a mechanical component, such as a shutter, interposed between the first lens element 1110 and the second lens element 1120 can control the amount of light exposure, the length of exposure time, or the filter so as to effectively adjust the image.

According to the image capturing system of the present disclosure, the lens elements thereof can be made of glass or plastic material. When the lens elements are made of glass material, the distribution of the refractive power of the image capturing system may be more flexible to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. The total track length of the image capturing system can thereby be reduced.

According to the image capturing system of the present disclosure, there can be at least one stop provided, such as an aperture stop, a glare stop, or a field stop. Said glare stop or said field stop is allocated for reducing the stray light and thereby improving the image resolution thereof.

According to the image capturing system of the present disclosure, when the lens element has a convex surface, it indicates that the surface is convex at the paraxial region; and when the lens element has a concave surface, it indicates that the surface is concave at the paraxial region.

According to the image capturing system of the present disclosure, the image capturing system is featured with good correction ability and high image quality, and can be applied to 3D (three-dimensional) image capturing applications, in products such as digital cameras, mobile devices and tablets.

According to the above description of the present disclosure, the following 1st-10th specific embodiments are provided for further explanation.

1st Embodiment

Figure 1B:
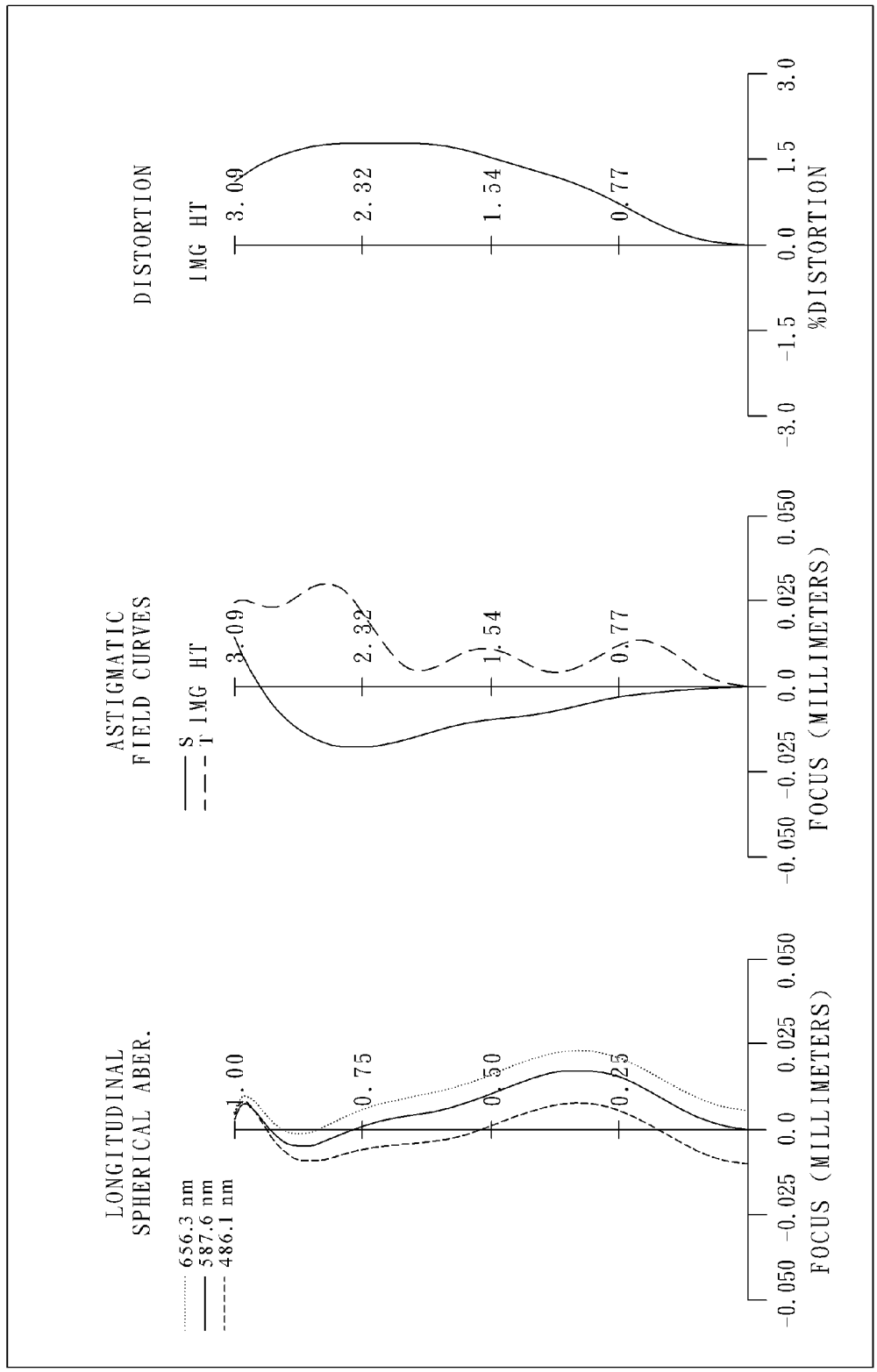
FIG. 1B shows spherical aberration curves, astigmatic field curves and a distortion curve of the image capturing system according to the 1st embodiment.

FIG. 1A is a schematic view of an image capturing system according to the 1st embodiment of the present disclosure. FIG. 1B shows spherical aberration curves, astigmatic field curves and a distortion curve of the image capturing system according to the 1st embodiment. In FIG. 1A, the image capturing system includes, in order from an object side to an image side, an aperture stop 100, a first lens element 110, a second lens element 120, a third lens element 130, a fourth lens element 140, a fifth lens element 150, an IR-cut filter 160 and an image plane 170, wherein the image capturing system has a total of five lens elements (110-150) with refractive power.

The first lens element 110 with positive refractive power has a convex object-side surface 111 at a paraxial region and a concave image-side surface 112 at a paraxial region, and is made of plastic material. The object-side surface 111 and the image-side surface 112 of the first lens element 110 are aspheric.

The second lens element 120 with negative refractive power has a convex object-side surface 121 at a paraxial region and a concave image-side surface 122 at a paraxial region, and is made of plastic material. The object-side surface 121 and the image-side surface 122 of the second lens element 120 are aspheric, wherein the shape of the object-side surface 121 of the second lens element 120 changes from convex at the paraxial region to concave at a peripheral region.

The third lens element 130 with positive refractive power has a convex object-side surface 131 at a paraxial region and a convex image-side surface 132 at a paraxial region, and is made of plastic material. The object-side surface 131 and the image-side surface 132 of the third lens element 130 are aspheric.

The fourth lens element 140 with negative refractive power has a concave object-side surface 141 at a paraxial region and a convex image-side surface 142 at a paraxial region, and is made of plastic material. The object-side surface 141 and the image-side surface 142 of the fourth lens element 140 are aspheric.

The fifth lens element 150 with negative refractive power has a convex object-side surface 151 at a paraxial region and a concave image-side surface 152 at a paraxial region, and is made of plastic material. The object-side surface 151 and the image-side surface 152 of the fifth lens element 150 are aspheric, wherein the shape of the image-side surface 152 of the fifth lens element 150 changes from concave at the paraxial region to convex at a peripheral region.

The IR-cut filter 160 is made of glass, and located between the fifth lens element 150 and the image plane 170, and will not affect the focal length of the image capturing system.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

Wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing system according to the 1st embodiment, when a focal length of the image capturing system is f, an f-number of the image capturing system is Fno, and half of the maximal field of view is HFOV, these parameters have the following values: f=3.81 mm; Fno=2.08; and HFOV=38.7 degrees.

In the image capturing system according to the 1st embodiment, when an Abbe number of the second lens element 120 is V2, an Abbe number of the fourth lens element 140 is V4, and an Abbe number of the first lens element 110 is V1, the following relationship is satisfied: (V2+V4)/V1=0.85.

In the image capturing system according to the 1st embodiment, when an axial distance between the first lens element 110 and the second lens element 120 is T12, and a central thickness of the second lens element 120 is CT2, the following relationship is satisfied: T12/CT2=1.47.

In the image capturing system according to the 1st embodiment, when the axial distance between the first lens element 110 and the second lens element 120 is T12, and an axial distance between the third lens element 130 and the fourth lens element 140 is T34, the following relationship is satisfied: T12/T34=1.37.

In the image capturing system according to the 1st embodiment, when an axial distance between the second lens element 120 and the third lens element 130 is T23, the axial distance between the third lens element 130 and the fourth lens element 140 is T34, an axial distance between the fourth lens element 140 and the fifth lens element 150 is T45, and a central thickness of the fifth lens element 150 is CT5, the following relationship is satisfied: (T23+T34+T45)/CT5=0.57.

In the image capturing system according to the 1st embodiment, when a distance in parallel with an optical axis from a maximum effective diameter position on the image-side surface 142 of the fourth lens element 140 to an axial vertex on the image-side surface 142 of the fourth lens element 140 is SAG42, and a central thickness of the fourth lens element 140 is CT4, the following relationship is satisfied: |SAG42/CT4|=1.14.

In the image capturing system according to the 1st embodiment, when a curvature radius of the object-side surface 131 of the third lens element 130 is R5, and a curvature radius of the image-side surface 132 of the third lens element 130 is R6, the following relationship is satisfied: (R5+R6)/(R5−R6)=0.78.

In the image capturing system according to the 1st embodiment, when a curvature radius of the image-side surface 142 of the fourth lens element 140 is R8, and a focal length of the fourth lens element 140 is f4, the following relationship is satisfied: R8/f4=0.20.

In the image capturing system according to the 1st embodiment, when the focal length of the image capturing system is f, and a focal length of the third lens element 130 is f3, the following relationship is satisfied: f/f3=1.08.

In the image capturing system according to the 1st embodiment, when the focal length of the fourth lens element 140 is f4, and a focal length of the fifth lens element 150 is f5, the following relationship is satisfied: |f4/f5|=0.16.

The detailed optical data of the 1st embodiment are shown in Table 1 and the aspheric surface data are shown in Table 2 below.

TABLE 1

1st Embodiment
f = 3.81 mm, Fno = 2.08, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.305 | | | | |
| 2 | Lens 1 | 1.556 | ASP | 0.500 | Plastic | 1.544 | 55.9 | 4.34 |
| 3 | | 4.055 | ASP | 0.353 | | | | |
| 4 | Lens 2 | 3.757 | ASP | 0.240 | Plastic | 1.634 | 23.8 | −7.52 |
| 5 | | 2.049 | ASP | 0.147 | | | | |
| 6 | Lens 3 | 17.295 | ASP | 0.527 | Plastic | 1.544 | 55.9 | 3.55 |
| 7 | | −2.151 | ASP | 0.258 | | | | |
| 8 | Lens 4 | −1.095 | ASP | 0.350 | Plastic | 1.634 | 23.8 | −7.84 |
| 9 | | −1.579 | ASP | 0.169 | | | | |
| 10 | Lens 5 | 2.081 | ASP | 1.014 | Plastic | 1.535 | 56.3 | −48.68 |
| 11 | | 1.600 | ASP | 0.421 | | | | |
| 12 | IR-cut filter | Plano | | 0.210 | Glass | 1.517 | 64.2 | — |
| 13 | | Plano | | 0.645 | | | | |
| 14 | Image | Plano | | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | −3.8814E+00 | −1.0000E+00 | −7.6928E+01 | 2.3787E+00 | −1.1528E+01 |
| A4 = | 1.3502E−01 | −1.0612E−02 | −7.7070E−02 | −2.3682E−01 | −3.3851E−02 |
| A6 = | −1.6660E−02 | −1.4141E−02 | −2.1298E−01 | 1.8532E−01 | 4.7081E−02 |
| A8 = | 9.1831E−03 | 1.0560E−01 | 5.6413E−02 | −3.9618E−01 | 1.1803E−01 |
| A10 = | −2.5708E−02 | −2.9967E−01 | 2.0029E−01 | 5.3705E−01 | −1.3426E−01 |
| A12 = | 7.8935E−02 | 3.4546E−01 | −3.6115E−01 | −4.3520E−01 | 3.5394E−02 |
| A14 = | −5.4859E−02 | −1.8784E−01 | 1.4857E−01 | 1.3083E−01 | |

| Surface # | 7 | 8 | 9 | 10 | 11 |
|---|---|---|---|---|---|
| k = | −3.3563E+00 | −2.8781E+00 | −6.9156E+00 | −1.3117E+01 | −6.2396E−01 |
| A4 = | −7.3936E−02 | 2.1308E−02 | −3.7635E−01 | −3.5199E−01 | −2.2640E−01 |
| A6 = | −1.5302E−01 | −6.4107E−01 | 3.4173E−01 | 2.6656E−01 | 1.0259E−01 |
| A8 = | 4.1866E−01 | 1.5267E+00 | −1.4788E−01 | −1.5065E−01 | −3.9474E−02 |
| A10 = | −2.2857E−01 | −1.3472E+00 | 8.5140E−02 | 5.3200E−02 | 1.0208E−02 |
| A12 = | 3.6293E−02 | 5.4924E−01 | −3.6204E−02 | −9.1133E−03 | −1.6942E−03 |
| A14 = | | −8.7706E−02 | 5.4997E−03 | 4.8276E−04 | 1.6086E−04 |
| A16 = | | | | 1.8836E−05 | −6.7564E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
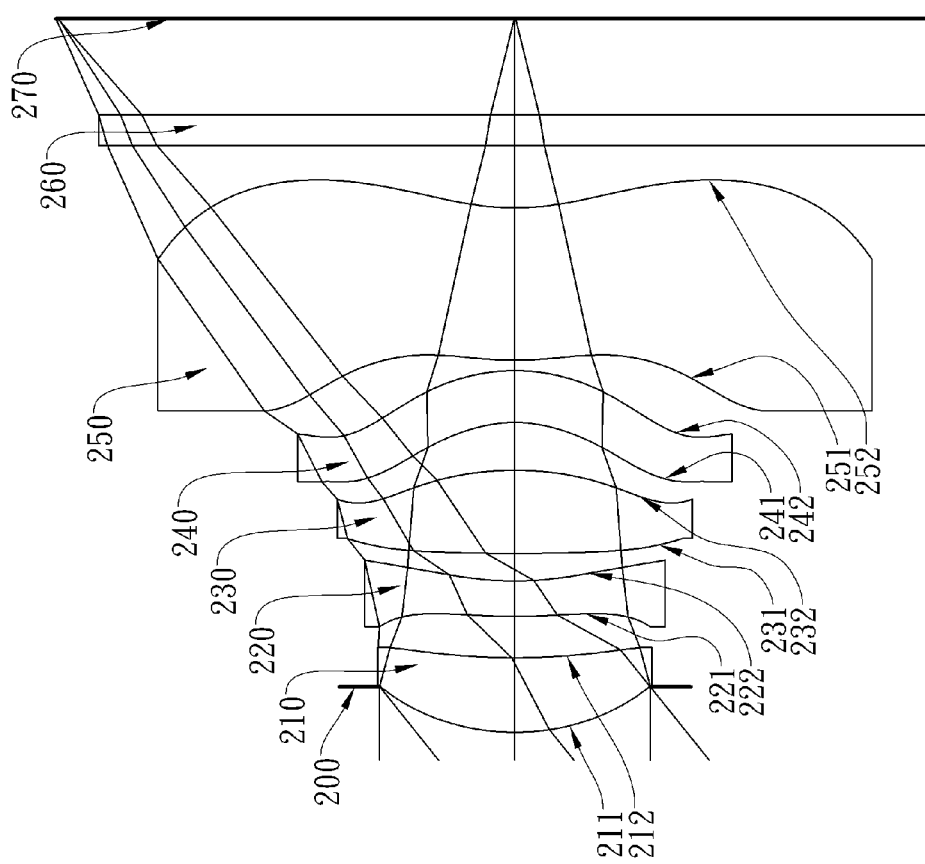
FIG. 2A is a schematic view of an image capturing system according to the 2nd embodiment of the present disclosure.
Figure 2B:
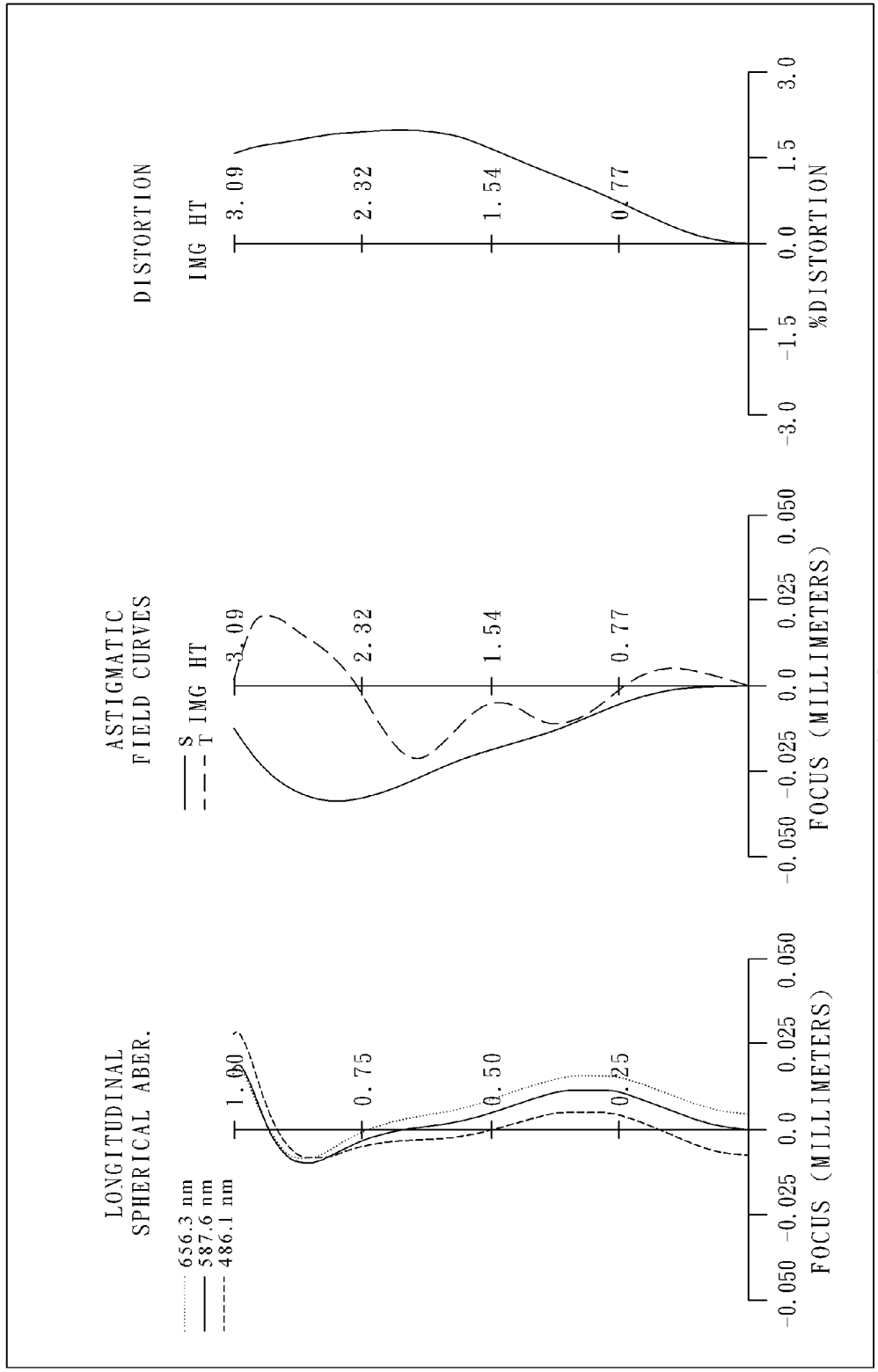
FIG. 2B shows spherical aberration curves, astigmatic field curves and a distortion curve of the image capturing system according to the 2nd embodiment.

FIG. 2A is a schematic view of an image capturing system according to the 2nd embodiment of the present disclosure. FIG. 2B shows spherical aberration curves, astigmatic field curves and a distortion curve of the image capturing system according to the 2nd embodiment. In FIG. 2A, the image capturing system includes, in order from an object side to an image side, an aperture stop 200, a first lens element 210, a second lens element 220, a third lens element 230, a fourth lens element 240, a fifth lens element 250, an IR-cut filter 260 and an image plane 270, wherein the image capturing system has a total of five lens elements (210-250) with refractive power.

The first lens element 210 with positive refractive power has a convex object-side surface 211 at a paraxial region and a concave image-side surface 212 at a paraxial region, and is made of plastic material. The object-side surface 211 and the image-side surface 212 of the first lens element 210 are aspheric.

The second lens element 220 with negative refractive power has a convex object-side surface 221 at a paraxial region and a concave image-side surface 222 at a paraxial region, and is made of plastic material. The object-side surface 221 and the image-side surface 222 of the second lens element 220 are aspheric, wherein the shape of the object-side surface 221 of the second lens element 220 changes from convex at the paraxial region to concave at a peripheral region.

The third lens element 230 with positive refractive power has a convex object-side surface 231 at a paraxial region and a convex image-side surface 232 at a paraxial region, and is made of plastic material. The object-side surface 231 and the image-side surface 232 of the third lens element 230 are aspheric.

The fourth lens element 240 with negative refractive power has a concave object-side surface 241 at a paraxial region and a convex image-side surface 242 at a paraxial region, and is made of plastic material. The object-side surface 241 and the image-side surface 242 of the fourth lens element 240 are aspheric.

The fifth lens element 250 with negative refractive power has a convex object-side surface 251 at a paraxial region and a concave image-side surface 252 at a paraxial region, and is made of plastic material. The object-side surface 251 and the image-side surface 252 of the fifth lens element 250 are aspheric, wherein the shape of the image-side surface 252 of the fifth lens element 250 changes from concave at the paraxial region to convex at a peripheral region.

The IR-cut filter 260 is made of glass, and located between the fifth lens element 250 and the image plane 270, and will not affect the focal length of the image capturing system.

The detailed optical data of the 2nd embodiment are shown in Table 3 and the aspheric surface data are shown in Table 4 below.

TABLE 3

2nd Embodiment
f = 3.79 mm, Fno = 2.07, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.308 | | | | |
| 2 | Lens 1 | 1.568 | ASP | 0.504 | Plastic | 1.544 | 55.9 | 4.25 |
| 3 | | 4.312 | ASP | 0.280 | | | | |
| 4 | Lens 2 | 3.692 | ASP | 0.240 | Plastic | 1.640 | 23.3 | −7.37 |

TABLE 3-continued

2nd Embodiment
f = 3.79 mm, Fno = 2.07, HFOV = 38.7 deg.

| Surface # | | Curvature Radius | Thickness | Material | Index | Abbe # | Focal Length |
|---|---|---|---|---|---|---|---|
| 5 | | 2.018 | ASP | 0.186 | | | |
| 6 | Lens 3 | 11.621 | ASP | 0.564 | Plastic | 1.544 | 55.9 | 3.36 |
| 7 | | −2.129 | ASP | 0.325 | | | |
| 8 | Lens 4 | −0.872 | ASP | 0.350 | Plastic | 1.640 | 23.3 | −6.53 |
| 9 | | −1.276 | ASP | 0.070 | | | |
| 10 | Lens 5 | 2.029 | ASP | 1.032 | Plastic | 1.535 | 56.3 | −152.17 |
| 11 | | 1.629 | ASP | 0.421 | | | |
| 12 | IR-cut filter | Plano | | 0.210 | Glass | 1.517 | 64.2 | — |
| 13 | | Plano | | 0.650 | | | |
| 14 | Image | Plano | | — | | | |

Note:
Reference wavelength (d-line) is 587.6 nm.

TABLE 4

Aspheric Coefficients

| Surface # | 2 | 3 | 4 | 5 | 6 |
|---|---|---|---|---|---|
| k = | −3.6885E+00 | −1.0000E+00 | −6.7669E+01 | 2.4248E+00 | −7.1271E+01 |
| A4 = | 1.2861E−01 | −1.7103E−02 | −9.6841E−02 | −2.5451E−01 | −1.7605E−02 |
| A6 = | −1.7702E−02 | −2.4359E−02 | −1.4227E−01 | 2.3958E−01 | 1.0979E−02 |
| A8 = | 1.7975E−02 | 1.2102E−01 | 1.5580E−02 | −4.9091E−01 | 1.0634E−01 |
| A10 = | −1.7170E−02 | −2.6403E−01 | 2.3174E−01 | 6.4588E−01 | −9.9829E−02 |
| A12 = | 6.1575E−02 | 2.6879E−01 | −4.0494E−01 | −5.1095E−01 | 2.6680E−02 |
| A14 = | −4.7702E−02 | −1.5444E−01 | 1.7182E−01 | 1.5604E−01 | |

| Surface # | 7 | 8 | 9 | 10 | 11 |
|---|---|---|---|---|---|
| k = | −2.9331E+00 | −3.9387E+00 | −6.4490E+00 | −5.4019E+00 | −5.8405E−01 |
| A4 = | −3.0415E−02 | 4.3930E−02 | −2.9246E−01 | −4.5904E−01 | −2.3302E−01 |
| A6 = | −2.0334E−01 | −9.3842E−01 | 7.6629E−02 | 3.7501E−01 | 1.1282E−01 |
| A8 = | 3.7203E−01 | 1.9744E+00 | 1.8770E−01 | −2.1120E−01 | −4.6886E−02 |
| A10 = | −1.6032E−01 | −1.6529E+00 | −1.2320E−01 | 6.7326E−02 | 1.3063E−02 |
| A12 = | 1.8613E−02 | 6.5448E−01 | 2.7203E−02 | −8.1545E−03 | −2.3281E−03 |
| A14 = | | −1.0279E−01 | −2.0698E−03 | −3.7682E−04 | 2.3657E−04 |
| A16 = | | | | 1.0547E−04 | −1.0569E−05 |

In the image capturing system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f [mm] | 3.79 | (T23 + T34 + T45)/CT5 | 0.56 |
| Fno | 2.07 | |SAG42/CT4| | 1.22 |
| HFOV [deg.] | 38.7 | (R5 + R6)/(R5 − R6) | 0.69 |
| (V2 + V4)/V1 | 0.83 | R8/f4 | 0.20 |
| T12/CT2 | 1.17 | f/f3 | 1.13 |
| T12/T34 | 0.86 | |f4/f5| | 0.04 |

3rd Embodiment

Figure 3A:
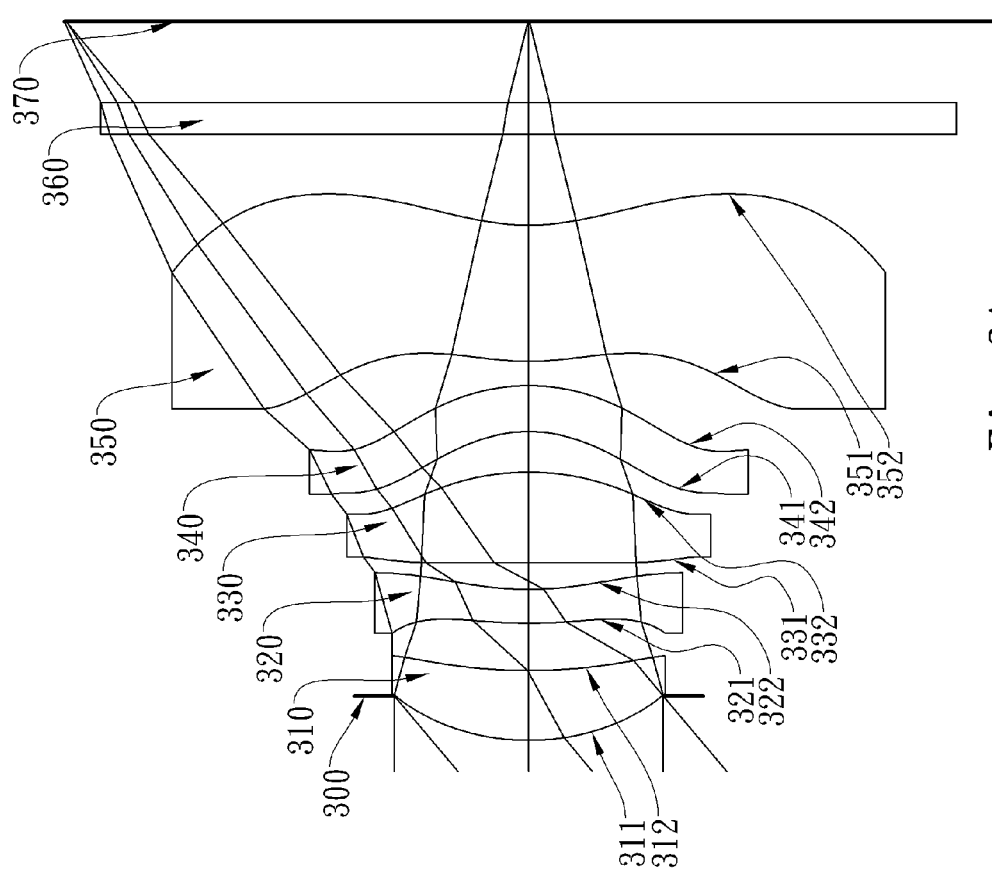
FIG. 3A is a schematic view of an image capturing system according to the 3rd embodiment of the present disclosure.
Figure 3B:
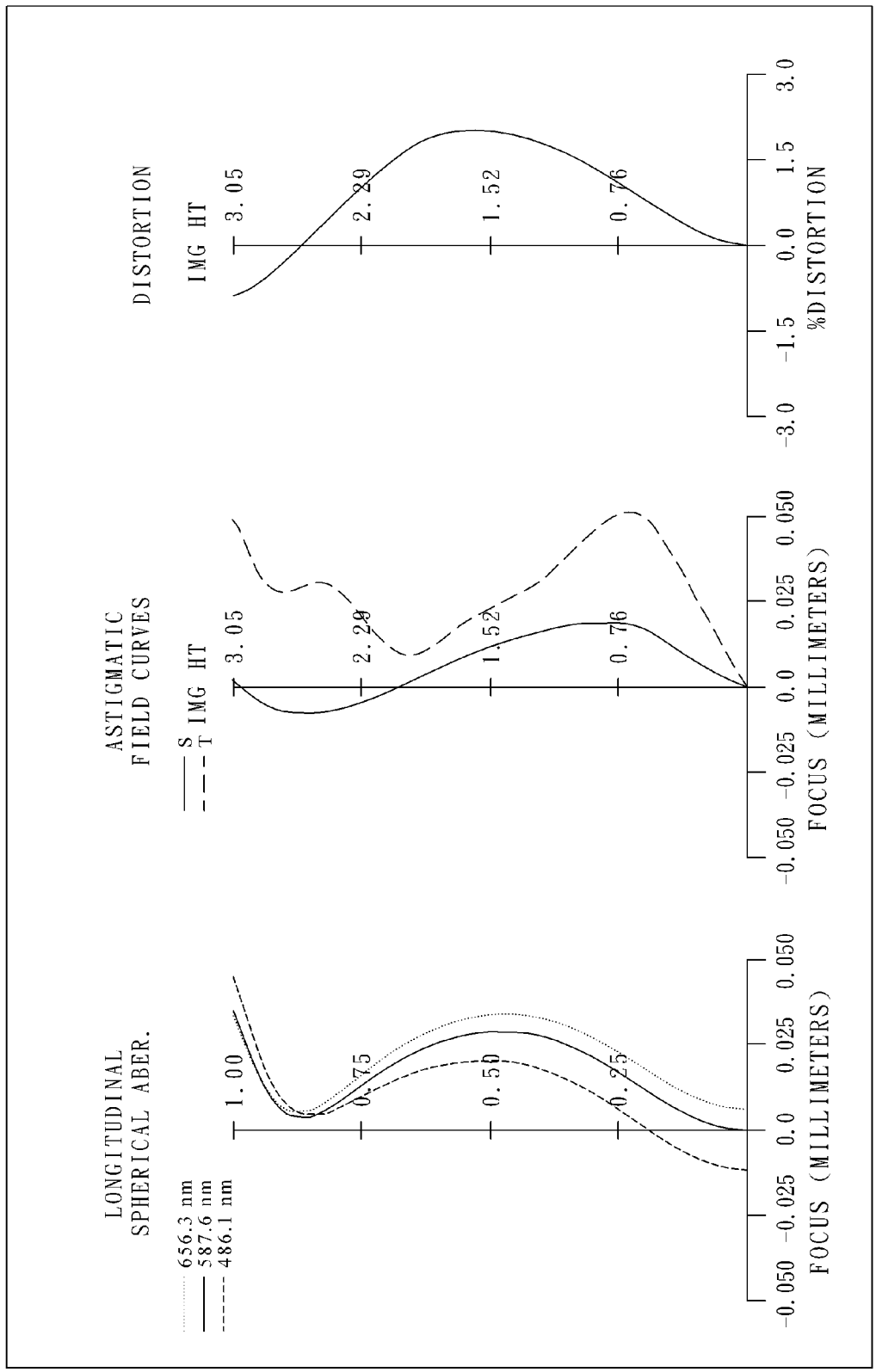
FIG. 3B shows spherical aberration curves, astigmatic field curves and a distortion curve of the image capturing system according to the 3rd embodiment.

FIG. 3A is a schematic view of an image capturing system according to the 3rd embodiment of the present disclosure. FIG. 3B shows spherical aberration curves, astigmatic field curves and a distortion curve of the image capturing system according to the 3rd embodiment. In FIG. 3A, the image capturing system includes, in order from an object side to an image side, an aperture stop 300, a first lens element 310, a second lens element 320, a third lens element 330, a fourth lens element 340, a fifth lens element 350, an IR-cut filter 360 and an image plane 370, wherein the image capturing system has a total of five lens elements (310-350) with refractive power.

The first lens element 310 with positive refractive power has a convex object-side surface 311 at a paraxial region and a concave image-side surface 312 at a paraxial region, and is made of plastic material. The object-side surface 311 and the image-side surface 312 of the first lens element 310 are aspheric.

The second lens element 320 with negative refractive power has a convex object-side surface 321 at a paraxial region and a concave image-side surface 322 at a paraxial region, and is made of plastic material. The object-side surface 321 and the image-side surface 322 of the second lens element 320 are aspheric, wherein the shape of the object-side surface 321 of the second lens element 320 changes from convex at the paraxial region to concave at a peripheral region.

The third lens element 330 with positive refractive power has a concave object-side surface 331 at a paraxial region and a convex image-side surface 332 at a paraxial region, and is made of plastic material. The object-side surface 331 and the image-side surface 332 of the third lens element 330 are aspheric.

The fourth lens element 340 with negative refractive power has a concave object-side surface 341 at a paraxial region and a convex image-side surface 342 at a paraxial region, and is made of plastic material. The object-side surface 341 and the image-side surface 342 of the fourth lens element 340 are aspheric.

The fifth lens element 350 with positive refractive power has a convex object-side surface 351 at a paraxial region and a concave image-side surface 352 at a paraxial region, and is made of plastic material. The object-side surface 351 and the image-side surface 352 of the fifth lens element 350 are aspheric, wherein the shape of the image-side surface 352 of the fifth lens element 350 changes from concave at the paraxial region to convex at a peripheral region.

The IR-cut filter 360 is made of glass, and located between the fifth lens element 350 and the image plane 370, and will not affect the focal length of the image capturing system.

The detailed optical data of the 3rd embodiment are shown in Table 5 and the aspheric surface data are shown in Table 6 below.

Moreover, these parameters can be calculated from Table 5 and Table 6 as the following values and satisfy the following relationships:

| f [mm] | 3.64 | (T23 + T34 + T45)/CT5 | 0.67 |
|---|---|---|---|
| Fno | 2.05 | |SAG42/CT4| | 1.40 |
| HFOV [deg.] | 40.1 | (R5 + R6)/(R5 − R6) | 1.05 |
| (V2 + V4)/V1 | 0.83 | R8/f4 | 0.22 |
| T12/CT2 | 1.40 | f/f3 | 1.16 |
| T12/T34 | 1.16 | |f4/f5| | 0.02 |

4th Embodiment

Figure 4A:
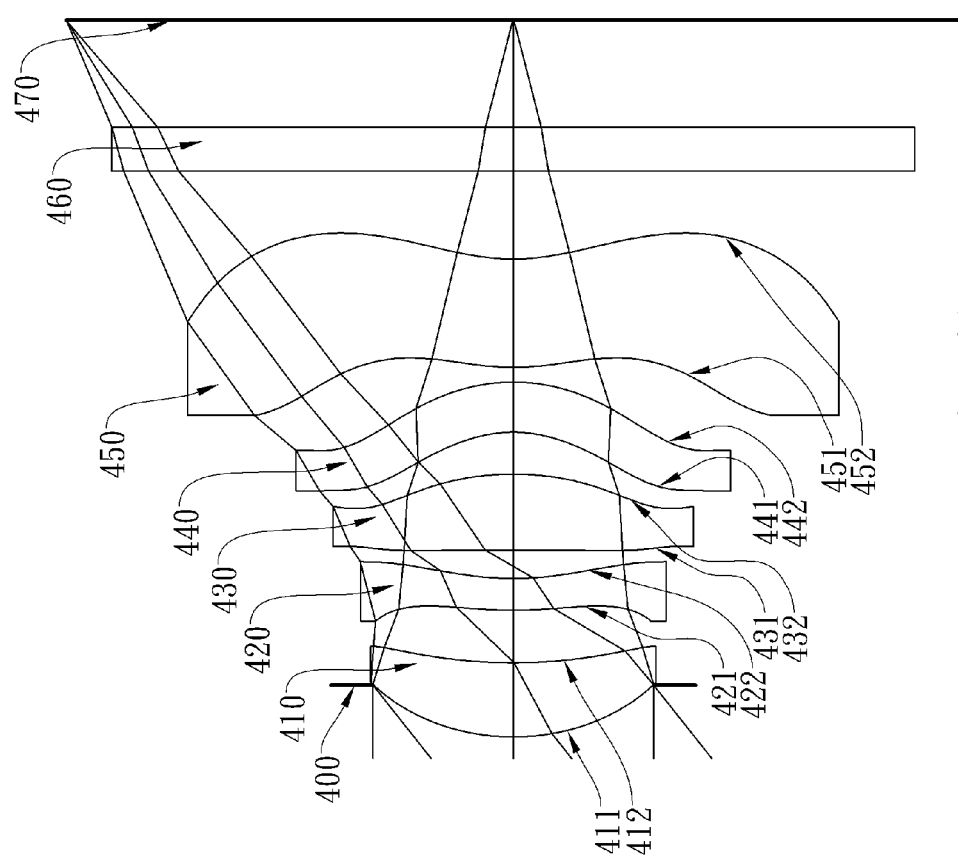
FIG. 4A is a schematic view of an image capturing system according to the 4th embodiment of the present disclosure.
Figure 4B:
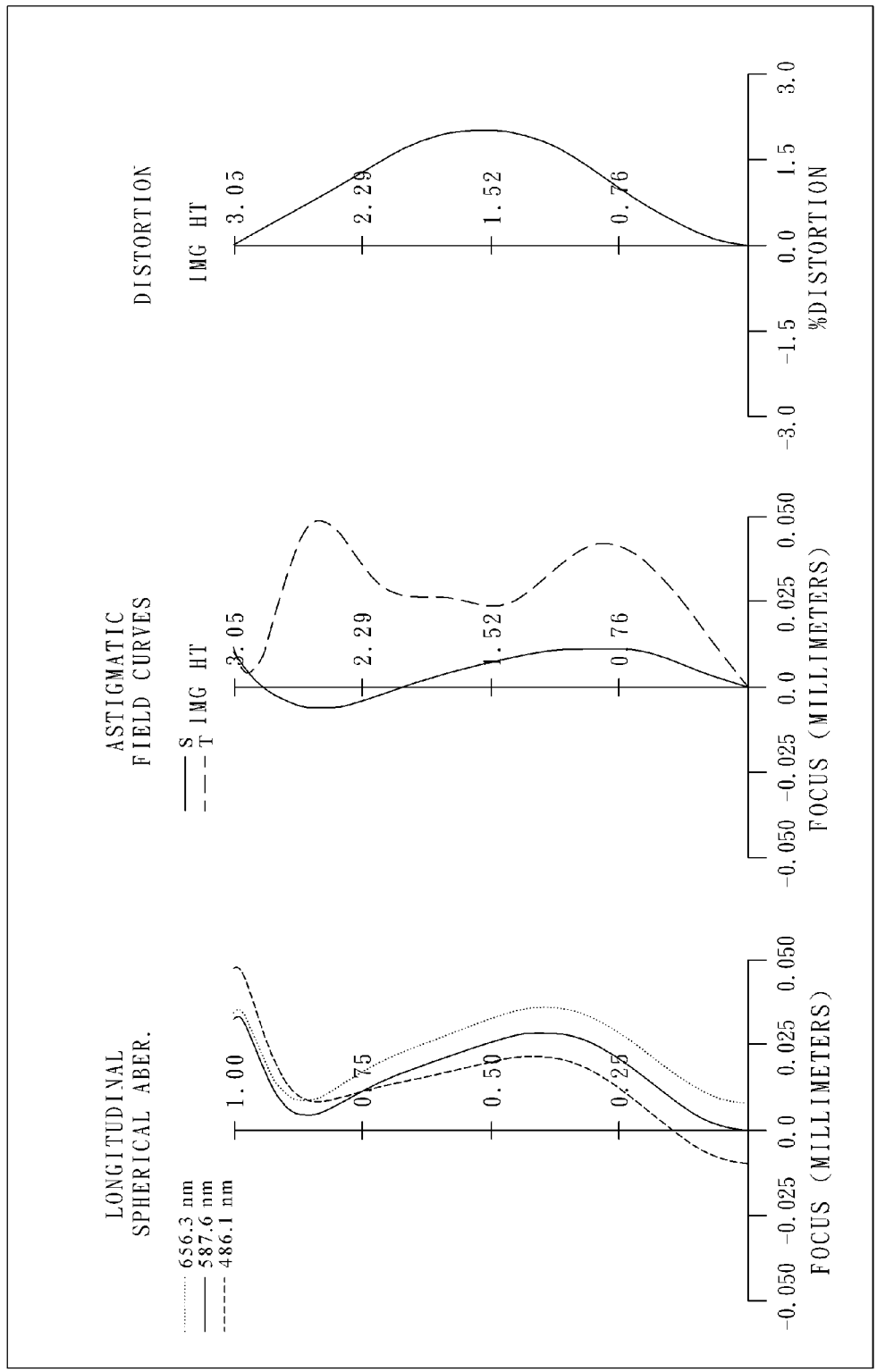
FIG. 4B shows spherical aberration curves, astigmatic field curves and a distortion curve of the image capturing system according to the 4th embodiment.

FIG. 4A is a schematic view of an image capturing system according to the 4th embodiment of the present disclosure. FIG. 4B shows spherical aberration curves, astigmatic field curves and a distortion curve of the image capturing system

TABLE 5

3rd Embodiment
f = 3.64 mm, Fno = 2.05, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.294 | | | | |
| 2 | Lens 1 | 1.544 | ASP | 0.461 | Plastic | 1.544 | 55.9 | 4.76 |
| 3 | | 3.415 | ASP | 0.313 | | | | |
| 4 | Lens 2 | 2.981 | ASP | 0.224 | Plastic | 1.640 | 23.3 | −10.85 |
| 5 | | 2.024 | ASP | 0.176 | | | | |
| 6 | Lens 3 | −65.613 | ASP | 0.599 | Plastic | 1.544 | 55.9 | 3.13 |
| 7 | | −1.666 | ASP | 0.269 | | | | |
| 8 | Lens 4 | −0.865 | ASP | 0.303 | Plastic | 1.640 | 23.3 | −5.74 |
| 9 | | −1.286 | ASP | 0.160 | | | | |
| 10 | Lens 5 | 1.820 | ASP | 0.900 | Plastic | 1.535 | 55.7 | 329.88 |
| 11 | | 1.522 | ASP | 0.600 | | | | |
| 12 | IR-cut filter | Plano | | 0.210 | Glass | 1.517 | 64.2 | — |
| 13 | | Plano | | 0.535 | | | | |
| 14 | Image | Plano | | — | | | | |

Note:
Reference wavelength (d-line) is 587.6 nm.

TABLE 6

| Aspheric Coefficients | | | | | |
|---|---|---|---|---|---|
| Surface # | 2 | 3 | 4 | 5 | 6 |
| k = | −3.3418E+00 | −1.1672E+00 | −3.0000E+01 | 2.5262E+00 | −3.0000E+01 |
| A4 = | 1.2494E−01 | −1.5032E−02 | −1.0873E−01 | −2.2508E−01 | −1.1456E−02 |
| A6 = | −1.2040E−02 | −2.1427E−02 | −1.8322E−01 | 9.4898E−02 | 2.9401E−02 |
| A8 = | 2.7056E−02 | 1.2076E−01 | −3.0982E−02 | −3.3874E−01 | 1.1647E−01 |
| A10 = | −2.9932E−02 | −2.9821E−01 | 2.3477E−01 | 5.4503E−01 | −1.3406E−01 |
| A12 = | 6.0247E−02 | 3.4496E−01 | −2.8397E−01 | −4.6360E−01 | 3.6453E−02 |
| A14 = | −3.5931E−02 | −1.9599E−01 | 9.3828E−02 | 1.3796E−01 | −1.4613E−03 |
| Surface # | 7 | 8 | 9 | 10 | 11 |
| k = | −5.4891E+00 | −3.2953E+00 | −8.0380E+00 | −5.1279E+00 | −6.3390E−01 |
| A4 = | −1.1306E−01 | 1.7798E−04 | −3.7202E−01 | −3.7410E−01 | −2.3701E−01 |
| A6 = | −1.5290E−01 | −6.4342E−01 | 3.3800E−01 | 2.6905E−01 | 1.0431E−01 |
| A8 = | 4.2240E−01 | 1.5316E+00 | −1.4880E−01 | −1.5055E−01 | −3.9981E−02 |
| A10 = | −2.2946E−01 | −1.3456E+00 | 8.5288E−02 | 5.3157E−02 | 1.0222E−02 |
| A12 = | 3.5386E−02 | 5.4878E−01 | −3.6088E−02 | −9.0968E−03 | −1.6872E−03 |
| A14 = | 6.9688E−04 | −8.8337E−02 | 5.4638E−03 | 4.8809E−04 | 1.6068E−04 |
| A16 = | | | | 1.7064E−05 | −6.8821E−06 |

In the image capturing system according to the 3rd embodiment, the definitions of these parameters shown in the following table are the same as those stated in the 1st embodiment with corresponding values for the 3rd embodiment.

according to the 4th embodiment. In FIG. 4A, the image capturing system includes, in order from an object side to an image side, an aperture stop 400, a first lens element 410, a second lens element 420, a third lens element 430, a fourth lens element 440, a fifth lens element 450, an IR-cut filter 460 and an image plane 470, wherein the image capturing system has a total of five lens elements (410-450) with refractive power.

The first lens element 410 with positive refractive power has a convex object-side surface 411 at a paraxial region and a concave image-side surface 412 at a paraxial region, and is made of plastic material. The object-side surface 411 and the image-side surface 412 of the first lens element 410 are aspheric.

The second lens element 420 with negative refractive power has a convex object-side surface 421 at a paraxial region and a concave image-side surface 422 at a paraxial region, and is made of plastic material. The object-side surface 421 and the image-side surface 422 of the second lens element 420 are aspheric, wherein the shape of the object-side surface 421 of the second lens element 420 changes from convex at the paraxial region to concave at a peripheral region.

The third lens element 430 with positive refractive power has a concave object-side surface 431 at a paraxial region and a convex image-side surface 432 at a paraxial region, and is made of plastic material. The object-side surface 431 and the image-side surface 432 of the third lens element 430 are aspheric.

The fourth lens element 440 with negative refractive power has a concave object-side surface 441 at a paraxial region and a convex image-side surface 442 at a paraxial region, and is made of plastic material. The object-side surface 441 and the image-side surface 442 of the fourth lens element 440 are aspheric.

The fifth lens element 450 with positive refractive power has a convex object-side surface 451 at a paraxial region and a concave image-side surface 452 at a paraxial region, and is made of plastic material. The object-side surface 451 and the image-side surface 452 of the fifth lens element 450 are aspheric, wherein the shape of the image-side surface 452 of the fifth lens element 450 changes from concave at the paraxial region to convex at a peripheral region.

The IR-cut filter 460 is made of glass, and located between the fifth lens element 450 and the image plane 470, and will not affect the focal length of the image capturing system.

The detailed optical data of the 4th embodiment are shown in Table 7 and the aspheric surface data are shown in Table 8 below.

TABLE 7

4th Embodiment
f = 3.83 mm, Fno = 2.00, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.354 | | | | |
| 2 | Lens 1 | 1.538 | ASP | 0.506 | Plastic | 1.544 | 55.9 | 4.68 |
| 3 | | 3.429 | ASP | 0.359 | | | | |
| 4 | Lens 2 | 2.955 | ASP | 0.217 | Plastic | 1.650 | 21.4 | −9.86 |
| 5 | | 1.964 | ASP | 0.194 | | | | |
| 6 | Lens 3 | −134.429 | ASP | 0.519 | Plastic | 1.544 | 55.9 | 3.67 |
| 7 | | −1.969 | ASP | 0.287 | | | | |
| 8 | Lens 4 | −0.880 | ASP | 0.342 | Plastic | 1.650 | 21.4 | −7.49 |
| 9 | | −1.238 | ASP | 0.101 | | | | |
| 10 | Lens 5 | 1.641 | ASP | 0.740 | Plastic | 1.535 | 55.7 | 52.57 |
| 11 | | 1.469 | ASP | 0.600 | | | | |
| 12 | IR-cut filter | Plano | | 0.300 | Glass | 1.517 | 64.2 | — |
| 13 | | Plano | | 0.730 | | | | |
| 14 | Image | Plano | | | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | −3.5461E+00 | −2.9388E−01 | −3.0000E+01 | 2.1655E+00 | −1.0000E+00 |
| A4 = | 1.2682E−01 | −1.1977E−02 | −9.9149E−02 | −2.3433E−01 | −2.9081E−02 |
| A6 = | −9.2932E−03 | −2.3613E−02 | −1.6259E−01 | 1.0188E−01 | 1.3121E−02 |
| A8 = | 1.2569E−02 | 1.3356E−01 | −2.6947E−02 | −3.2892E−01 | 1.2942E−01 |
| A10 = | −3.0793E−02 | −2.9604E−01 | 2.4565E−01 | 5.4603E−01 | −1.2147E−01 |
| A12 = | 7.0917E−02 | 3.1715E−01 | −2.7446E−01 | −4.6602E−01 | 3.9195E−02 |
| A14 = | −3.7744E−02 | −1.5632E−01 | 7.2818E−02 | 1.3672E−01 | −9.8178E−03 |

| Surface # | 7 | 8 | 9 | 10 | 11 |
|---|---|---|---|---|---|
| k = | −5.0350E+00 | −3.4298E+00 | −7.0394E+00 | −3.2175E+00 | −6.1528E−01 |
| A4 = | −1.0571E−01 | −1.4037E−02 | −3.5840E−01 | −4.0521E−01 | −2.7123E−01 |
| A6 = | −1.4520E−01 | −6.2205E−01 | 3.1803E−01 | 2.7583E−01 | 1.1586E−01 |
| A8 = | 4.2671E−01 | 1.5221E+00 | −1.4434E−01 | −1.5072E−01 | −4.3232E−02 |
| A10 = | −2.3102E−01 | −1.3462E+00 | 8.6270E−02 | 5.3033E−02 | 1.0625E−02 |
| A12 = | 3.2912E−02 | 5.4974E−01 | −3.6101E−02 | −9.0915E−03 | −1.6835E−03 |
| A14 = | 1.0574E−03 | −8.8302E−02 | 5.3758E−03 | 4.9631E−04 | 1.5564E−04 |
| A16 = | | | | 1.5614E−05 | −7.0308E−06 |

In the image capturing system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 3.83 | (T23 + T34 + T45)/CT5 | 0.79 |
|---|---|---|---|
| Fno | 2.00 | |SAG42/CT4| | 1.37 |
| HFOV [deg.] | 38.4 | (R5 + R6)/(R5 − R6) | 1.03 |
| (V2 + V4)/V1 | 0.77 | R8/f4 | 0.17 |
| T12/CT2 | 1.65 | f/f3 | 1.05 |
| T12/T34 | 1.25 | |f4/f5| | 0.14 |

5th Embodiment

Figure 5A:
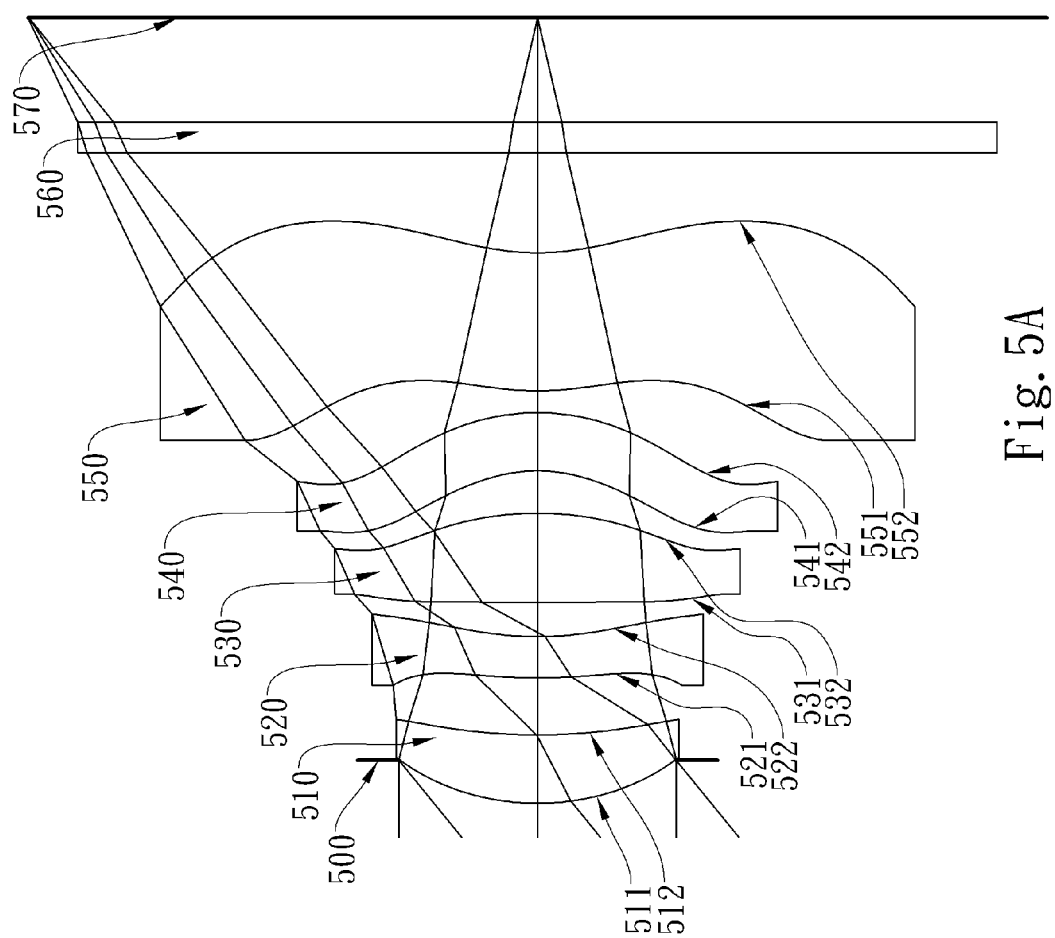
FIG. 5A is a schematic view of an image capturing system according to the 5th embodiment of the present disclosure.
Figure 5B:
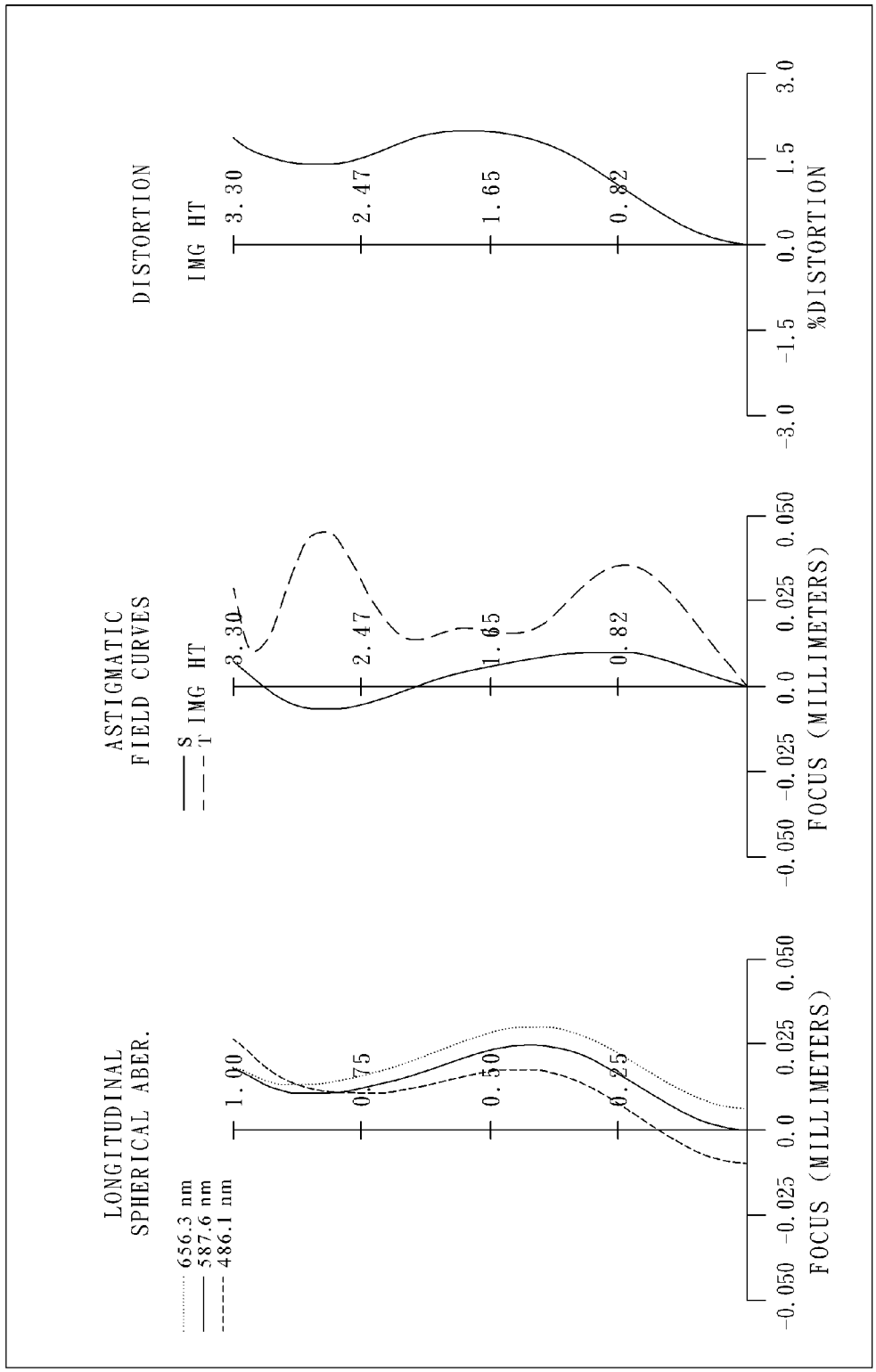
FIG. 5B shows spherical aberration curves, astigmatic field curves and a distortion curve of the image capturing system according to the 5th embodiment.

FIG. 5A is a schematic view of an image capturing system according to the 5th embodiment of the present disclosure. FIG. 5B shows spherical aberration curves, astigmatic field curves and a distortion curve of the image capturing system according to the 5th embodiment. In FIG. 5A, the image capturing system includes, in order from an object side to an image side, an aperture stop 500, a first lens element 510, a second lens element 520, a third lens element 530, a fourth lens element 540, a fifth lens element 550, an IR-cut filter 560 and an image plane 570, wherein the image capturing system has a total of five lens elements (510-550) with refractive power.

The first lens element 510 with positive refractive power has a convex object-side surface 511 at a paraxial region and a concave image-side surface 512 at a paraxial region, and is made of plastic material. The object-side surface 511 and the image-side surface 512 of the first lens element 510 are aspheric.

The second lens element 520 with negative refractive power has a convex object-side surface 521 at a paraxial region and a concave image-side surface 522 at a paraxial region, and is made of plastic material. The object-side surface 521 and the image-side surface 522 of the second lens element 520 are aspheric, wherein the shape of the object-side surface 521 of the second lens element 520 changes from convex at the paraxial region to concave at a peripheral region.

The third lens element 530 with positive refractive power has a convex object-side surface 531 at a paraxial region and a convex image-side surface 532 at a paraxial region, and is made of plastic material. The object-side surface 531 and the image-side surface 532 of the third lens element 530 are aspheric.

The fourth lens element 540 with negative refractive power has a concave object-side surface 541 at a paraxial region and a convex image-side surface 542 at a paraxial region, and is made of plastic material. The object-side surface 541 and the image-side surface 542 of the fourth lens element 540 are aspheric.

The fifth lens element 550 with positive refractive power has a convex object-side surface 551 at a paraxial region and a concave image-side surface 552 at a paraxial region, and is made of plastic material. The object-side surface 551 and the image-side surface 552 of the fifth lens element 550 are aspheric, wherein the shape of the image-side surface 552 of the fifth lens element 550 changes from concave at the paraxial region to convex at a peripheral region.

The IR-cut filter 560 is made of glass, and located between the fifth lens element 550 and the image plane 570, and will not affect the focal length of the image capturing system.

The detailed optical data of the 5th embodiment are shown in Table 9 and the aspheric surface data are shown in Table 10 below.

TABLE 9

5th Embodiment
f = 3.96 mm, Fno = 2.20, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.279 | | | | |
| 2 | Lens 1 | 1.630 | ASP | 0.444 | Plastic | 1.565 | 57.7 | 4.85 |
| 3 | | 3.629 | ASP | 0.370 | | | | |
| 4 | Lens 2 | 3.200 | ASP | 0.269 | Plastic | 1.640 | 23.3 | −9.86 |
| 5 | | 2.054 | ASP | 0.223 | | | | |
| 6 | Lens 3 | 110.107 | ASP | 0.579 | Plastic | 1.565 | 57.7 | 3.62 |
| 7 | | −2.078 | ASP | 0.276 | | | | |
| 8 | Lens 4 | −0.954 | ASP | 0.377 | Plastic | 1.640 | 23.3 | −6.79 |
| 9 | | −1.411 | ASP | 0.142 | | | | |
| 10 | Lens 5 | 1.785 | ASP | 0.897 | Plastic | 1.535 | 55.7 | 53.10 |
| 11 | | 1.571 | ASP | 0.649 | | | | |
| 12 | IR-cut filter | Plano | | 0.200 | Glass | 1.517 | 64.2 | — |
| 13 | | Plano | | 0.678 | | | | |
| 14 | Image | Plano | | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | −3.3404E+00 | −9.5786E−01 | −3.0000E+01 | 2.1406E+00 | −1.0000E+00 |
| A4 = | 1.0466E−01 | −1.1077E−02 | −8.7269E−02 | −1.8386E−01 | −1.1964E−02 |

TABLE 10-continued

| Aspheric Coefficients | | | | |
|---|---|---|---|---|
| A6 = | −2.3653E−03 | −1.9563E−02 | −1.0911E−01 | 6.8430E−02 | 8.1812E−03 |
| A8 = | 6.6135E−03 | 8.0021E−02 | −2.8631E−02 | −1.9094E−01 | 7.1734E−02 |
| A10 = | −1.0664E−02 | −1.5129E−01 | 1.1174E−01 | 2.6403E−01 | −6.0382E−02 |
| A12 = | 3.1480E−02 | 1.3056E−01 | −1.1422E−01 | −1.9753E−01 | 1.6754E−02 |
| A14 = | −1.9778E−02 | −6.2895E−02 | 2.3309E−02 | 5.2537E−02 | −2.9914E−03 |

| Surface # | 7 | 8 | 9 | 10 | 11 |
|---|---|---|---|---|---|
| k = | −7.0649E+00 | −3.7137E+00 | −7.8711E+00 | −3.7328E+00 | −6.3054E−01 |
| A4 = | −8.6115E−02 | −6.3228E−03 | −2.7839E−01 | −3.1807E−01 | −2.1034E−01 |
| A6 = | −9.8008E−02 | −4.2004E−01 | 2.1403E−01 | 1.8652E−01 | 7.7739E−02 |
| A8 = | 2.4703E−01 | 8.7710E−01 | −8.3059E−02 | −8.6756E−02 | −2.4875E−02 |
| A10 = | −1.1318E−01 | −6.6232E−01 | 4.2521E−02 | 2.6113E−02 | 5.2344E−03 |
| A12 = | 1.3743E−02 | 2.3112E−01 | −1.5163E−02 | −3.8199E−03 | −7.0816E−04 |
| A14 = | −2.4281E−05 | −3.1726E−02 | 1.9284E−03 | 1.7742E−04 | 5.5881E−05 |
| A16 = | | | | 4.8208E−06 | −2.1019E−06 |

In the image capturing system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f [mm] | 3.96 | (T23 + T34 + T45)/CT5 | 0.71 |
|---|---|---|---|
| Fno | 2.20 | |SAG42/CT4| | 1.19 |
| HFOV [deg.] | 39.2 | (R5 + R6)/(R5 − R6) | 0.96 |
| (V2 + V4)/V1 | 0.81 | R8/f4 | 0.21 |
| T12/CT2 | 1.38 | f/f3 | 1.09 |
| T12/T34 | 1.34 | |f4/f5| | 0.13 |

6th Embodiment

Figure 6A:
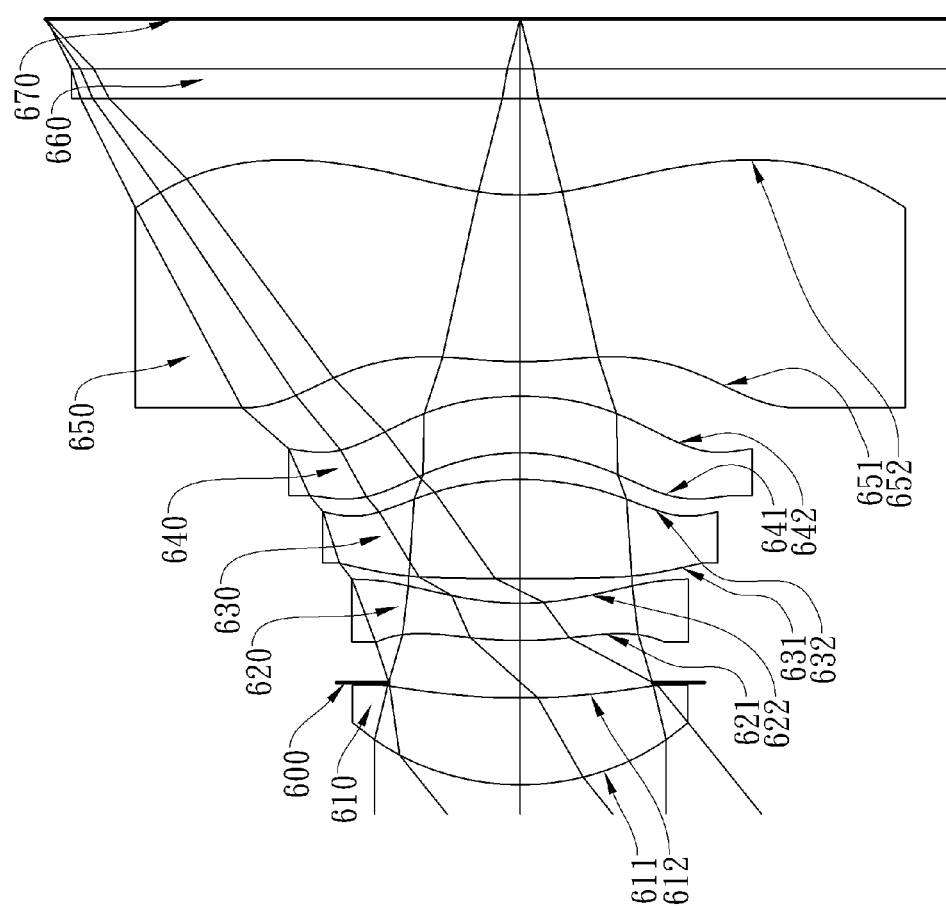
FIG. 6A is a schematic view of an image capturing system according to the 6th embodiment of the present disclosure.
Figure 6B:
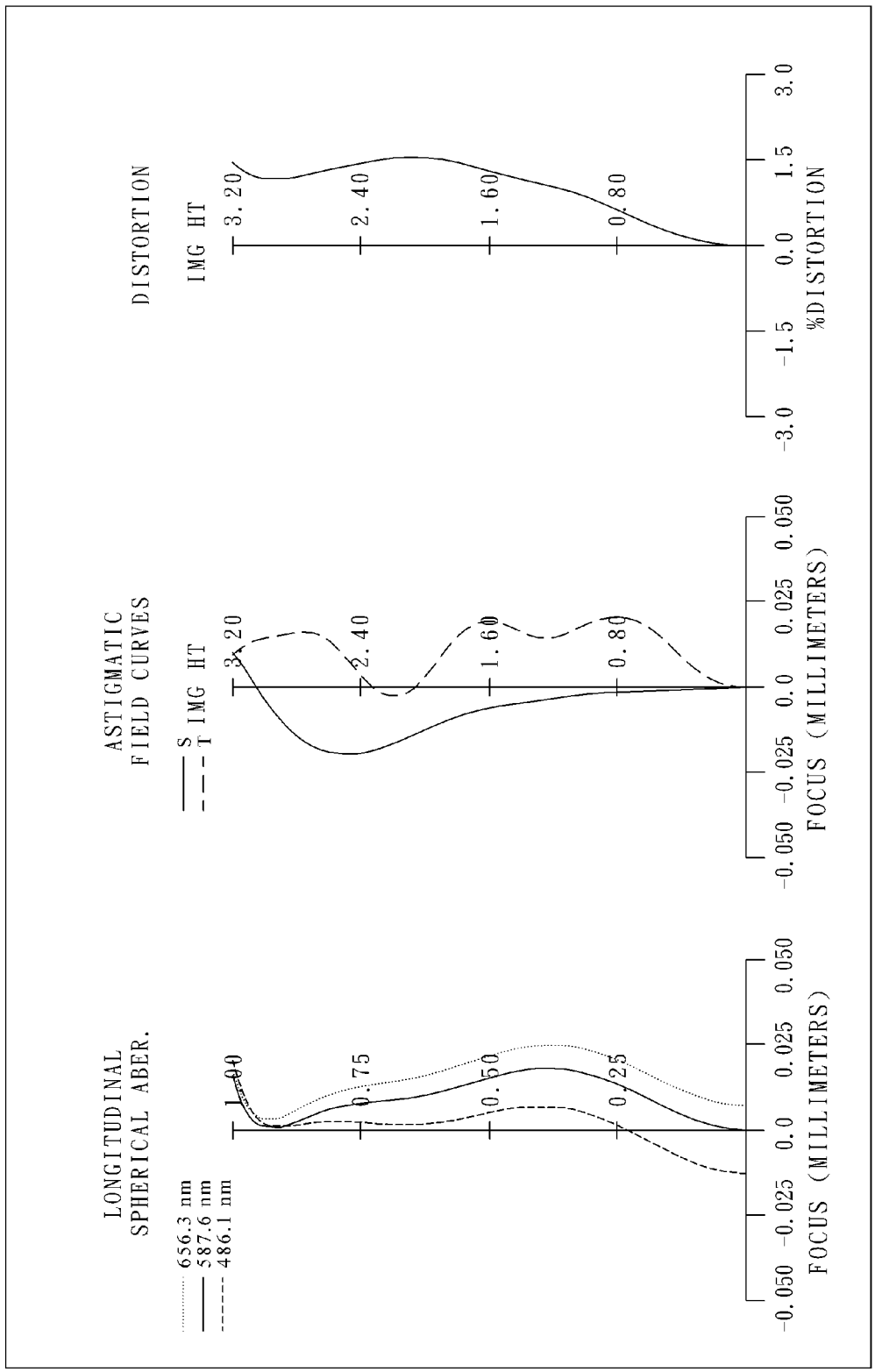
FIG. 6B shows spherical aberration curves, astigmatic field curves and a distortion curve of the image capturing system according to the 6th embodiment.

FIG. 6A is a schematic view of an image capturing system according to the 6th embodiment of the present disclosure. FIG. 6B shows spherical aberration curves, astigmatic field curves and a distortion curve of the image capturing system according to the 6th embodiment. In FIG. 6A, the image capturing system includes, in order from an object side to an image side, a first lens element 610, an aperture stop 600, a second lens element 620, a third lens element 630, a fourth lens element 640, a fifth lens element 650, an IR-cut filter 660 and an image plane 670, wherein the image capturing system has a total of five lens elements (610-650) with refractive power.

The first lens element 610 with positive refractive power has a convex object-side surface 611 at a paraxial region and a concave image-side surface 612 at a paraxial region, and is made of plastic material. The object-side surface 611 and the image-side surface 612 of the first lens element 610 are aspheric.

The second lens element 620 with negative refractive power has a convex object-side surface 621 at a paraxial region and a concave image-side surface 622 at a paraxial region, and is made of plastic material. The object-side surface 621 and the image-side surface 622 of the second lens element 620 are aspheric, wherein the shape of the object-side surface 621 of the second lens element 620 changes from convex at the paraxial region to concave at a peripheral region.

The third lens element 630 with positive refractive power has a convex object-side surface 631 at a paraxial region and a convex image-side surface 632 at a paraxial region, and is made of plastic material. The object-side surface 631 and the image-side surface 632 of the third lens element 630 are aspheric.

The fourth lens element 640 with negative refractive power has a concave object-side surface 641 at a paraxial region and a convex image-side surface 642 at a paraxial region, and is made of plastic material. The object-side surface 641 and the image-side surface 642 of the fourth lens element 640 are aspheric.

The fifth lens element 650 with negative refractive power has a convex object-side surface 651 at a paraxial region and a concave image-side surface 652 at a paraxial region, and is made of plastic material. The object-side surface 651 and the image-side surface 652 of the fifth lens element 650 are aspheric, wherein the shape of the image-side surface 652 of the fifth lens element 650 changes from concave at the paraxial region to convex at a peripheral region.

The IR-cut filter 660 is made of glass, and located between the fifth lens element 650 and the image plane 670, and will not affect the focal length of the image capturing system.

The detailed optical data of the 6th embodiment are shown in Table 11 and the aspheric surface data are shown in Table 12 below.

TABLE 11

| 6th Embodiment f = 3.92 mm, Fno = 2.00, HFOV = 38.8 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 1.769 | ASP | 0.583 | Plastic | 1.555 | 56.5 | 5.14 |
| 2 | | 4.106 | ASP | 0.107 | | | | |
| 3 | Ape. Stop | Plano | | 0.280 | | | | |
| 4 | Lens 2 | 2.512 | ASP | 0.251 | Plastic | 1.640 | 23.3 | −12.24 |

TABLE 11-continued

6th Embodiment
f = 3.92 mm, Fno = 2.00, HFOV = 38.8 deg.

| Surface # | | Curvature Radius | Thickness | Material | Index | Abbe # | Focal Length |
|---|---|---|---|---|---|---|---|
| 5 | | 1.827 | ASP | 0.167 | | | |
| 6 | Lens 3 | 37.181 | ASP | 0.667 | Plastic | 1.555 | 56.5 | 3.42 |
| 7 | | −1.989 | ASP | 0.180 | | | |
| 8 | Lens 4 | −1.372 | ASP | 0.381 | Plastic | 1.640 | 23.3 | −7.30 |
| 9 | | −2.152 | ASP | 0.233 | | | |
| 10 | Lens 5 | 2.500 | ASP | 1.122 | Plastic | 1.555 | 56.5 | −20.03 |
| 11 | | 1.714 | ASP | 0.649 | | | |
| 12 | IR-cut filter | Plano | | 0.200 | Glass | 1.517 | 64.2 | — |
| 13 | | Plano | | 0.335 | | | |
| 14 | Image | Plano | | — | | | |

Note:
Reference wavelength (d-line) is 587.6 nm.

TABLE 12

Aspheric Coefficients

| Surface # | 1 | 2 | 4 | 5 | 6 |
|---|---|---|---|---|---|
| k = | −3.4407E+00 | −2.0197E+00 | −1.8201E+01 | 1.1217E+00 | −1.0000E+00 |
| A4 = | 7.9605E−02 | −1.6500E−02 | −5.5316E−02 | −1.6565E−01 | 9.9478E−03 |
| A6 = | −1.1558E−02 | −2.0411E−02 | −1.4829E−01 | 2.6230E−02 | 2.3694E−02 |
| A8 = | 1.9594E−02 | 7.1979E−02 | −2.4625E−02 | −1.5181E−01 | 6.2930E−02 |
| A10 = | −3.1238E−02 | −1.0553E−01 | 1.5455E−01 | 2.5500E−01 | −7.0981E−02 |
| A12 = | 3.1744E−02 | 6.0794E−02 | −1.2604E−01 | −2.0419E−01 | 1.4222E−02 |
| A14 = | −1.2319E−02 | −1.3485E−02 | 3.8939E−02 | 5.6800E−02 | 2.3302E−03 |

| Surface # | 7 | 8 | 9 | 10 | 11 |
|---|---|---|---|---|---|
| k = | −1.0979E+01 | −4.1469E+00 | −1.0893E+01 | −1.1573E+01 | −6.1914E−01 |
| A4 = | −1.3139E−01 | 2.7484E−03 | −2.7729E−01 | −2.9303E−01 | −1.7867E−01 |
| A6 = | −6.5868E−02 | −4.2715E−01 | 2.1623E−01 | 1.8984E−01 | 7.1071E−02 |
| A8 = | 2.4238E−01 | 8.7541E−01 | −8.4024E−02 | −8.7357E−02 | −2.3459E−02 |
| A10 = | −1.1641E−01 | −6.6035E−01 | 4.2296E−02 | 2.5968E−02 | 5.1339E−03 |
| A12 = | 1.4057E−02 | 2.3115E−01 | −1.5140E−02 | −3.8350E−03 | −7.1510E−04 |
| A14 = | 7.1869E−04 | −3.1871E−02 | 1.9338E−03 | 1.7785E−04 | 5.6591E−05 |
| A16 = | | | | 5.8018E−06 | −1.9611E−06 |

In the image capturing system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f [mm] | 3.92 | (T23 + T34 + T45)/CT5 | 0.52 |
|---|---|---|---|
| Fno | 2.00 | \|SAG42/CT4\| | 0.93 |
| HFOV [deg.] | 38.8 | (R5 + R6)/(R5 − R6) | 0.90 |
| (V2 + V4)/V1 | 0.82 | R8/f4 | 0.29 |
| T12/CT2 | 1.54 | f/f3 | 1.15 |
| T12/T34 | 2.15 | \|f4/f5\| | 0.36 |

7th Embodiment

Figure 7A:
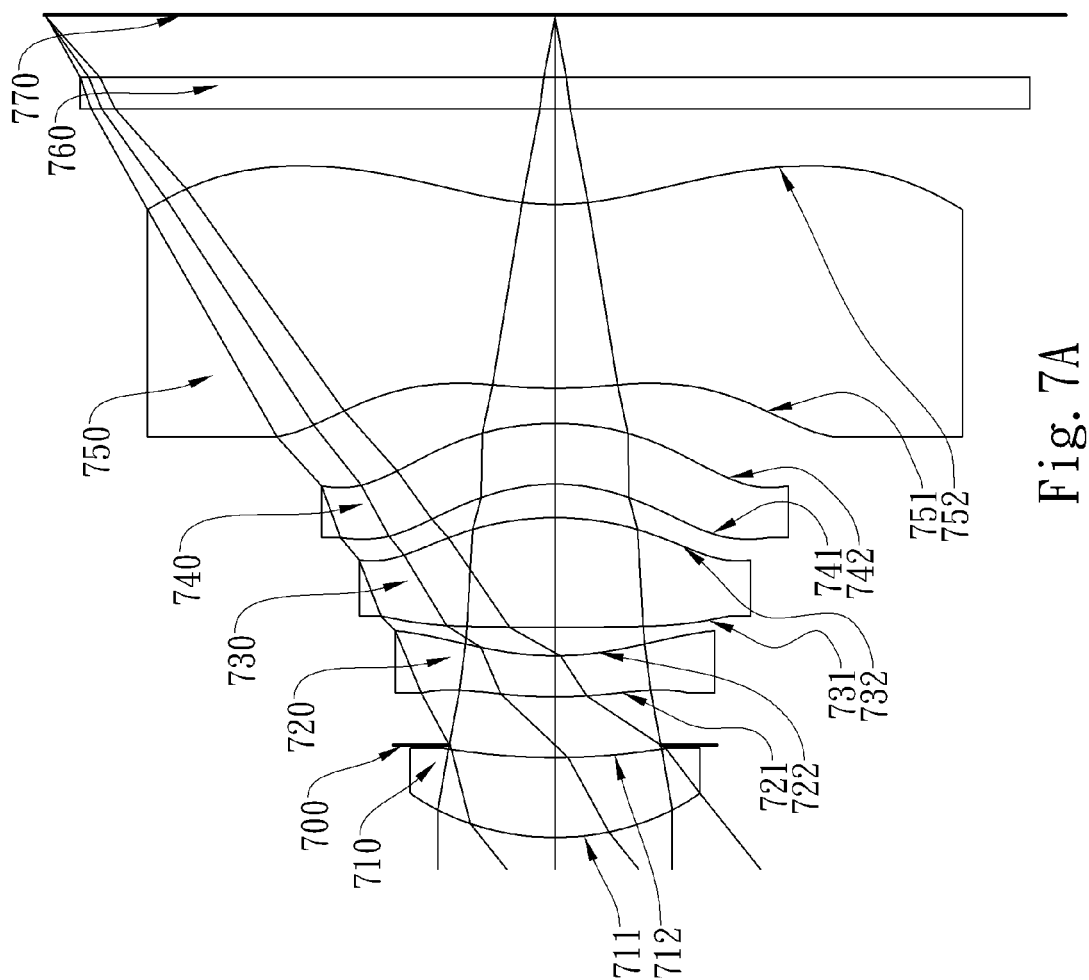
FIG. 7A is a schematic view of an image capturing system according to the 7th embodiment of the present disclosure.
Figure 7B:
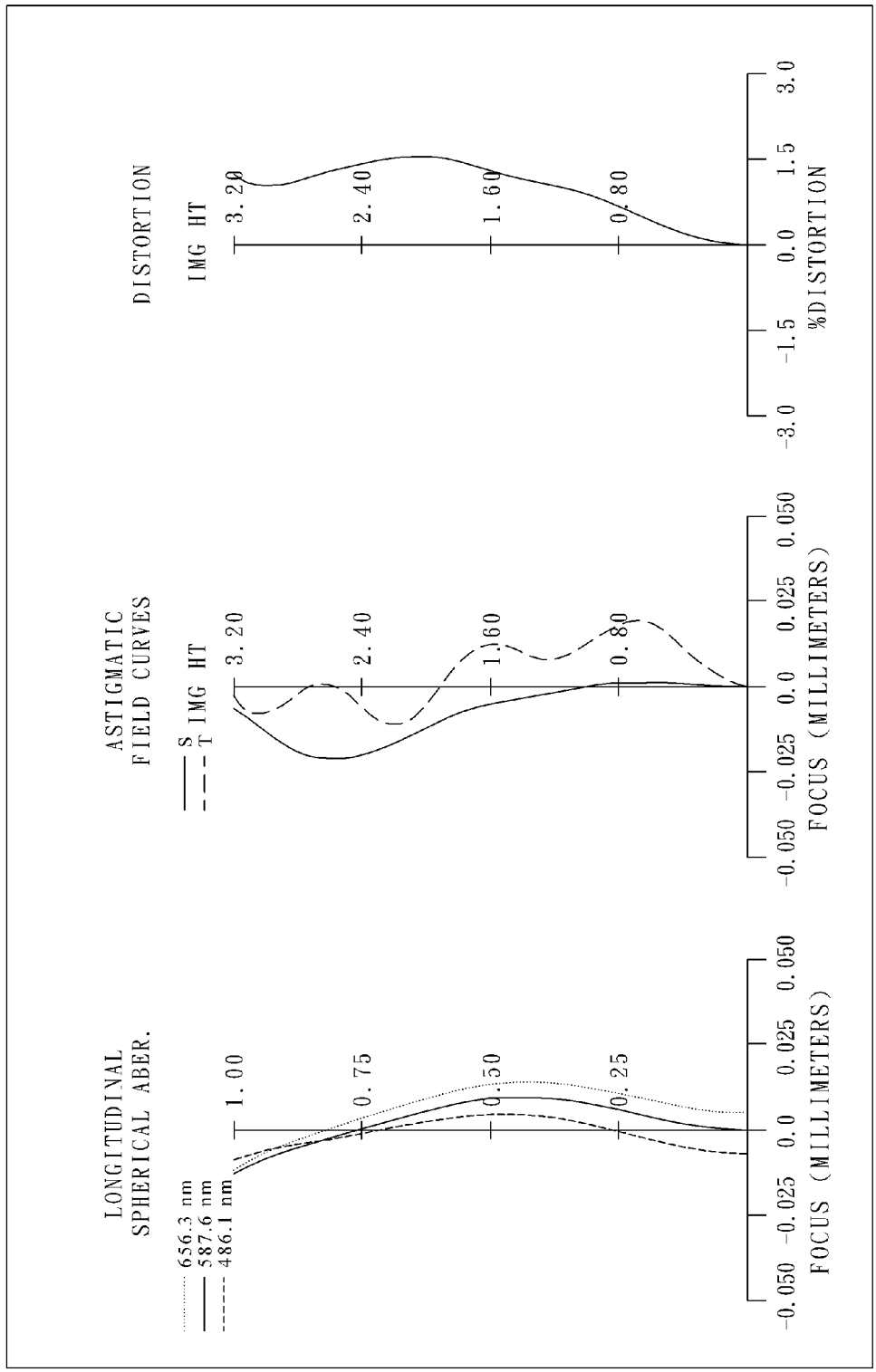
FIG. 7B shows spherical aberration curves, astigmatic field curves and a distortion curve of the image capturing system according to the 7th embodiment.

FIG. 7A is a schematic view of an image capturing system according to the 7th embodiment of the present disclosure. FIG. 7B shows spherical aberration curves, astigmatic field curves and a distortion curve of the image capturing system according to the 7th embodiment. In FIG. 7A, the image capturing system includes, in order from an object side to an image side, a first lens element 710, an aperture stop 700, a second lens element 720, a third lens element 730, a fourth lens element 740, a fifth lens element 750, an IR-cut filter 760 and an image plane 770, wherein the image capturing system has a total of five lens elements (710-750) with refractive power.

The first lens element 710 with positive refractive power has a convex object-side surface 711 at a paraxial region and a concave image-side surface 712 at a paraxial region, and is made of glass material. The object-side surface 711 and the image-side surface 712 of the first lens element 710 are aspheric.

The second lens element 720 with negative refractive power has a convex object-side surface 721 at a paraxial region and a concave image-side surface 722 at a paraxial region, and is made of plastic material. The object-side surface 721 and the image-side surface 722 of the second lens element 720 are aspheric, the shape of the object-side surface 721 of the second lens element 720 changes from convex at the paraxial region to concave at a peripheral region.

The third lens element 730 with positive refractive power has a convex object-side surface 731 at a paraxial region and a convex image-side surface 732 at a paraxial region, and is made of plastic material. The object-side surface 731 and the image-side surface 732 of the third lens element 730 are aspheric.

The fourth lens element 740 with negative refractive power has a concave object-side surface 741 at a paraxial region and a convex image-side surface 742 at a paraxial region, and is made of plastic material. The object-side surface 741 and the image-side surface 742 of the fourth lens element 740 are aspheric.

The fifth lens element 750 with negative refractive power has a convex object-side surface 751 at a paraxial region and a concave image-side surface 752 at a paraxial region, and is made of plastic material. The object-side surface 751 and the image-side surface 752 of the fifth lens element 750 are aspheric, wherein the shape of the image-side surface 752 of the fifth lens element 750 changes from concave at the paraxial region to convex at a peripheral region.

The IR-cut filter 760 is made of glass, and located between the fifth lens element 750 and the image plane 770, and will not affect the focal length of the image capturing system.

The detailed optical data of the 7th embodiment are shown in Table 13 and the aspheric surface data are shown in Table 14 below.

over, these parameters can be calculated from Table 13 and Table 14 as the following values and satisfy the following relationships:

| f [mm] | 3.97 | (T23 + T34 + T45)/CT5 | 0.53 |
|---|---|---|---|
| Fno | 2.70 | |SAG42/CT4| | 1.03 |
| HFOV [deg.] | 38.5 | (R5 + R6)/(R5 − R6) | 0.91 |
| (V2 + V4)/V1 | 0.74 | R8/f4 | 0.28 |
| T12/CT2 | 1.47 | f/f3 | 1.24 |
| T12/T34 | 1.80 | |f4/f5| | 0.40 |

8th Embodiment

Figure 8A:
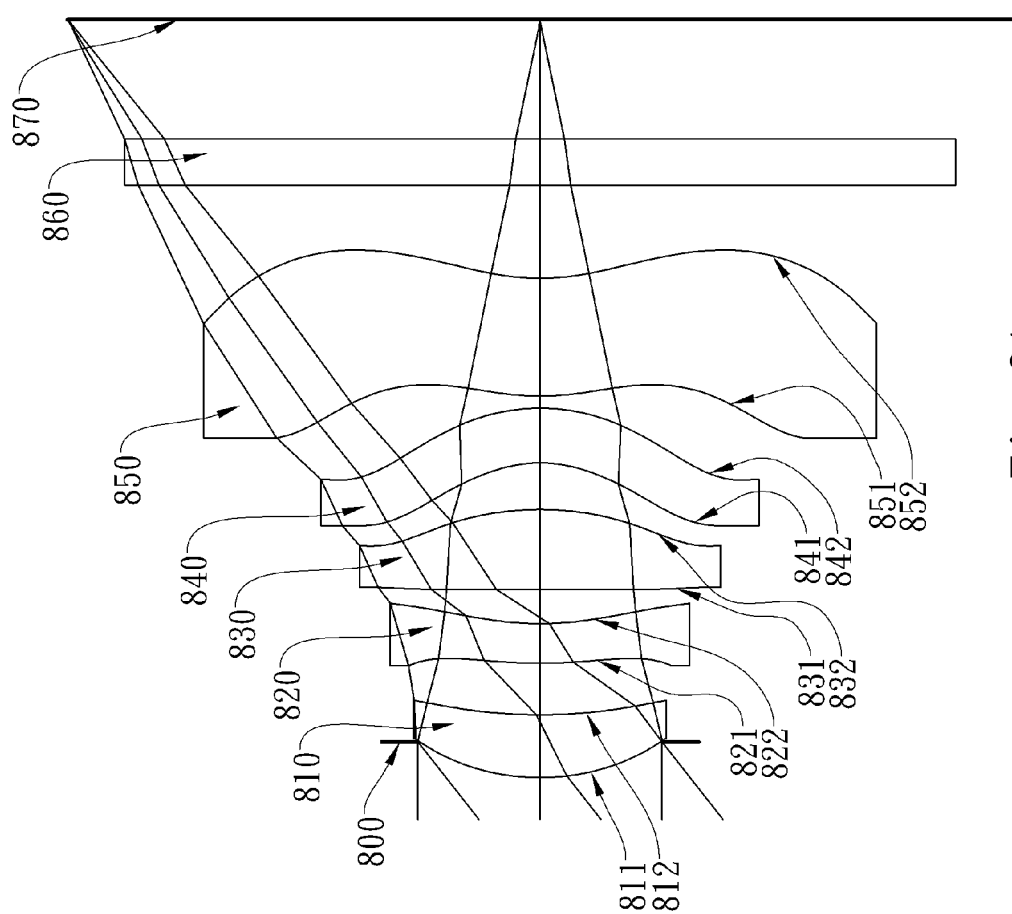
FIG. 8A is a schematic view of an image capturing system according to the 8th embodiment of the present disclosure.
Figure 8B:
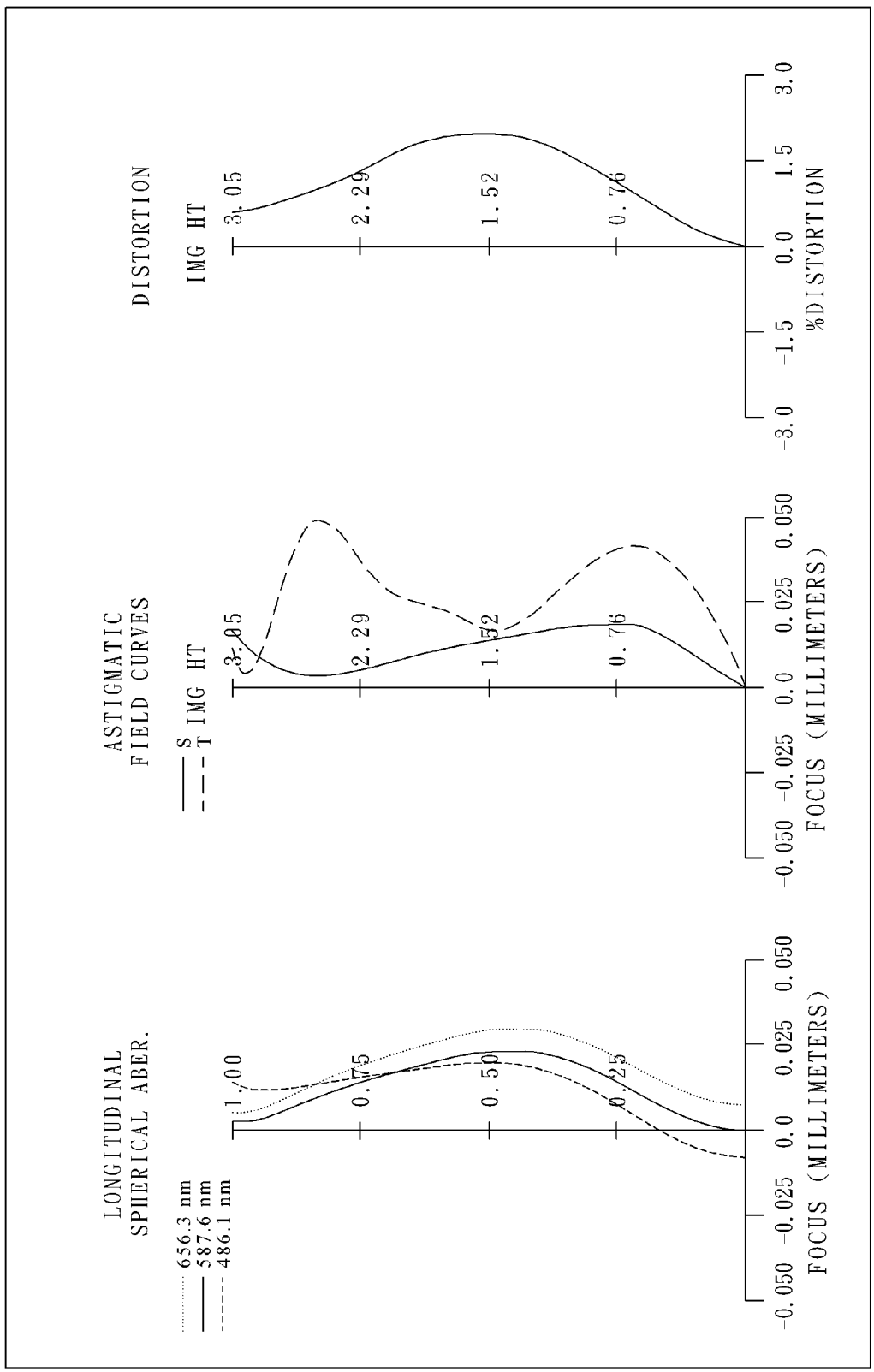
FIG. 8B shows spherical aberration curves, astigmatic field curves and a distortion curve of the image capturing system according to the 8th embodiment.

FIG. 8A is a schematic view of an image capturing system according to the 8th embodiment of the present disclosure. FIG. 8B shows spherical aberration curves, astigmatic field curves and a distortion curve of the image capturing system

TABLE 13

7th Embodiment
f = 3.97 mm, Fno = 2.70, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.681 | ASP | 0.501 | Glass | 1.542 | 62.9 | 5.05 |
| 2 | | 3.898 | ASP | 0.078 | | | | |
| 3 | Ape. Stop | Plano | | 0.302 | | | | |
| 4 | Lens 2 | 2.605 | ASP | 0.259 | Plastic | 1.633 | 23.4 | −11.40 |
| 5 | | 1.840 | ASP | 0.178 | | | | |
| 6 | Lens 3 | 38.570 | ASP | 0.689 | Plastic | 1.535 | 56.3 | 3.20 |
| 7 | | −1.781 | ASP | 0.211 | | | | |
| 8 | Lens 4 | −1.170 | ASP | 0.379 | Plastic | 1.633 | 23.4 | −6.59 |
| 9 | | −1.831 | ASP | 0.221 | | | | |
| 10 | Lens 5 | 2.615 | ASP | 1.154 | Plastic | 1.557 | 47.2 | −16.26 |
| 11 | | 1.709 | ASP | 0.600 | | | | |
| 12 | IR-cut filter | Plano | | 0.200 | Glass | 1.517 | 64.2 | — |
| 13 | | Plano | | 0.389 | | | | |
| 14 | Image | Plano | | — | | | | |

Note:
Reference wavelength (d-line) is 587.6 nm.

TABLE 14

Aspheric Coefficients

| Surface # | 1 | 2 | 4 | 5 | 6 |
|---|---|---|---|---|---|
| k = | −2.8958E+00 | −1.6885E+00 | −1.9307E+01 | 1.1552E+00 | −2.7867E+01 |
| A4 = | 8.4356E−02 | −1.5224E−02 | −6.2250E−02 | −1.6464E−01 | 8.5593E−03 |
| A6 = | −8.7622E−03 | −1.3907E−02 | −1.5185E−01 | 2.6756E−02 | 2.3014E−02 |
| A8 = | 2.5356E−02 | 6.6727E−02 | −2.2909E−02 | −1.5208E−01 | 6.2864E−02 |
| A10 = | −3.0543E−02 | −1.0538E−01 | 1.5683E−01 | 2.5512E−01 | −7.0769E−02 |
| A12 = | 3.1742E−02 | 6.1830E−02 | −1.2880E−01 | −2.0456E−01 | 1.4303E−02 |
| A14 = | −1.2613E−02 | −1.3464E−02 | 2.9790E−02 | 5.7738E−02 | 2.1935E−03 |

| Surface # | 7 | 8 | 9 | 10 | 11 |
|---|---|---|---|---|---|
| k = | −9.0431E+00 | −4.0623E+00 | −1.0058E+01 | −1.0490E+01 | −6.2232E−01 |
| A4 = | −1.3126E−01 | 2.0475E−03 | −2.7665E−01 | −2.9369E−01 | −1.7793E−01 |
| A6 = | −6.5780E−02 | −4.2719E−01 | 2.1638E−01 | 1.8978E−01 | 7.0988E−02 |
| A8 = | 2.4233E−01 | 8.7547E−01 | −8.4047E−02 | −8.7351E−02 | −2.3457E−02 |
| A10 = | −1.1646E−01 | −6.6036E−01 | 4.2282E−02 | 2.5971E−02 | 5.1351E−03 |
| A12 = | 1.4027E−02 | 2.3117E−01 | −1.5135E−02 | −3.8344E−03 | −7.1498E−04 |
| A14 = | 7.2282E−04 | −3.1882E−02 | 1.9392E−03 | 1.7788E−04 | 5.6592E−05 |
| A16 = | | | | 5.7734E−06 | −1.9635E−06 |

In the image capturing system according to the 7th embodiment, the definitions of these parameters shown in the following table are the same as those stated in the 1st embodiment with corresponding values for the 7th embodiment. More-according to the 8th embodiment. In FIG. 8A, the image capturing system includes, in order from an object side to an image side, an aperture stop 800, a first lens element 810, a second lens element 820, a third lens element 830, a fourth lens element 840, a fifth lens element 850, an IR-cut filter 860 and an image plane 870, wherein the image capturing system has a total of five lens elements (810-850) with refractive power.

The first lens element 810 with positive refractive power has a convex object-side surface 811 at a paraxial region and a concave image-side surface 812 at a paraxial region, and is made of plastic material. The object-side surface 811 and the image-side surface 812 of the first lens element 810 are aspheric.

The second lens element 820 with negative refractive power has a convex object-side surface 821 at a paraxial region and a concave image-side surface 822 at a paraxial region, and is made of plastic material. The object-side surface 821 and the image-side surface 822 of the second lens element 820 are aspheric, wherein the shape of the object-side surface 821 of the second lens element 820 changes from convex at the paraxial region to concave at a peripheral region.

The third lens element 830 with positive refractive power has a convex object-side surface 831 at a paraxial region and a convex image-side surface 832 at a paraxial region, and is made of plastic material. The object-side surface 831 and the image-side surface 832 of the third lens element 830 are aspheric.

The fourth lens element 840 with negative refractive power has a concave object-side surface 841 at a paraxial region and a convex image-side surface 842 at a paraxial region, and is made of plastic material. The object-side surface 841 and the image-side surface 842 of the fourth lens element 840 are aspheric.

The fifth lens element 850 with positive refractive power has a convex object-side surface 851 at a paraxial region and a concave image-side surface 852 at a paraxial region, and is made of plastic material. The object-side surface 851 and the image-side surface 852 of the fifth lens element 850 are aspheric, wherein the shape of the image-side surface 852 of the fifth lens element 850 changes from concave at the paraxial region to convex at a peripheral region.

The IR-cut filter 860 is made of glass, and located between the fifth lens element 850 and the image plane 870, and will not affect the focal length of the image capturing system.

The detailed optical data of the 8th embodiment are shown in Table 15 and the aspheric surface data are shown in Table 16 below.

TABLE 15

8th Embodiment
f = 3.86 mm, Fno = 2.45, HFOV = 38.1 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Ape. Stop | Plano | −0.230 | | | | | |
| 2 | Lens 1 | 1.474 | ASP | 0.405 | Plastic | 1.544 | 55.9 | 4.68 |
| 3 | | 3.156 | ASP | 0.333 | | | | |
| 4 | Lens 2 | 2.883 | ASP | 0.256 | Plastic | 1.650 | 21.4 | −9.86 |
| 5 | | 1.919 | ASP | 0.221 | | | | |
| 6 | Lens 3 | 61.636 | ASP | 0.516 | Plastic | 1.530 | 55.8 | 3.68 |
| 7 | | −2.011 | ASP | 0.302 | | | | |
| 8 | Lens 4 | −0.820 | ASP | 0.354 | Plastic | 1.650 | 21.4 | −6.40 |
| 9 | | −1.196 | ASP | 0.077 | | | | |
| 10 | Lens 5 | 1.537 | ASP | 0.761 | Plastic | 1.535 | 55.7 | 24.29 |
| 11 | | 1.442 | ASP | 0.600 | | | | |
| 12 | IR-cut filter | Plano | | 0.300 | Glass | 1.517 | 64.2 | — |
| 13 | | Plano | | 0.770 | | | | |
| 14 | Image | Plano | | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −3.1039E+00 | −2.1903E+00 | −2.7605E+01 | 2.2888E+00 | −1.0000E+00 |
| A4 = | 1.3169E−01 | −1.6798E−02 | −9.7025E−02 | −2.3383E−01 | −3.2373E−02 |
| A6 = | −3.5131E−03 | −1.7494E−02 | −1.5613E−01 | 1.0270E−01 | −1.9311E−03 |
| A8 = | 1.9582E−02 | 1.3340E−01 | −2.3955E−02 | −3.3504E−01 | 1.2526E−01 |
| A10 = | −2.2091E−02 | −3.1055E−01 | 2.1884E−01 | 5.3998E−01 | −1.1771E−01 |
| A12 = | 7.0521E−02 | 3.2614E−01 | −2.7967E−01 | −4.6491E−01 | 4.1325E−02 |
| A14 = | −4.7889E−02 | −1.7796E−01 | 6.4919E−02 | 1.4076E−01 | −1.0924E−02 |

| Surface # | 7 | 8 | 9 | 10 | 11 |
|---|---|---|---|---|---|
| k = | −5.3261E+00 | −3.4801E+00 | −7.1955E+00 | −2.9183E+00 | −6.1296E−01 |
| A4 = | −1.0526E−01 | −1.8552E−02 | −3.5549E−01 | −4.0908E−01 | −2.7427E−01 |
| A6 = | −1.4719E−01 | −6.1998E−01 | 3.1711E−01 | 2.7593E−01 | 1.1602E−01 |
| A8 = | 4.2552E−01 | 1.5232E+00 | −1.4436E−01 | −1.5049E−01 | −4.3203E−02 |
| A10 = | −2.3189E−01 | −1.3455E+00 | 8.6300E−02 | 5.3105E−02 | 1.0616E−02 |
| A12 = | 3.2497E−02 | 5.4985E−01 | −3.6066E−02 | −9.0896E−03 | −1.6840E−03 |
| A14 = | 1.4157E−03 | −8.8694E−02 | 5.3772E−03 | 4.9528E−04 | 1.5558E−04 |
| A16 = | | | | 1.5477E−05 | −7.0401E−06 |

In the image capturing system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f [mm] | 3.86 | (T23 + T34 + T45)/CT5 | 0.79 |
|---|---|---|---|
| Fno | 2.45 | \|SAG42/CT4\| | 1.30 |
| HFOV [deg.] | 38.1 | (R5 + R6)/(R5 − R6) | 0.94 |
| (V2 + V4)/V1 | 0.77 | R8/f4 | 0.19 |
| T12/CT2 | 1.30 | f/f3 | 1.05 |
| T12/T34 | 1.10 | \|f4/f5\| | 0.26 |

9th Embodiment

Figure 9A:
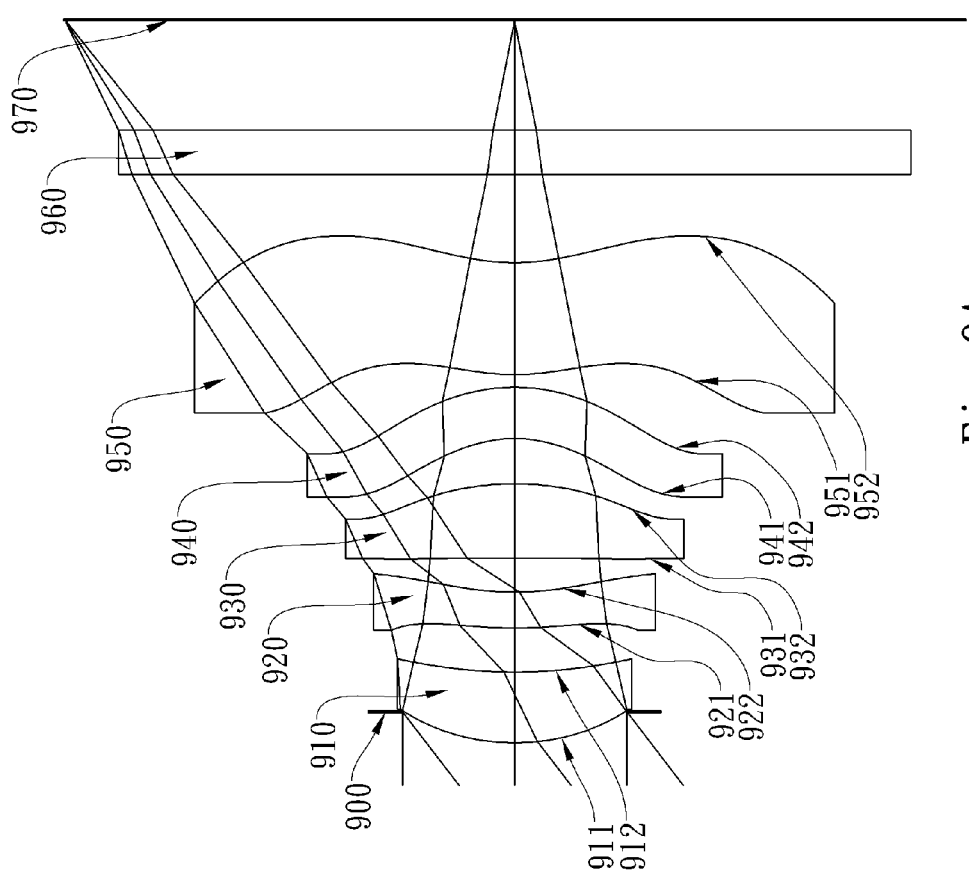
FIG. 9A is a schematic view of an image capturing system according to the 9th embodiment of the present disclosure.
Figure 9B:
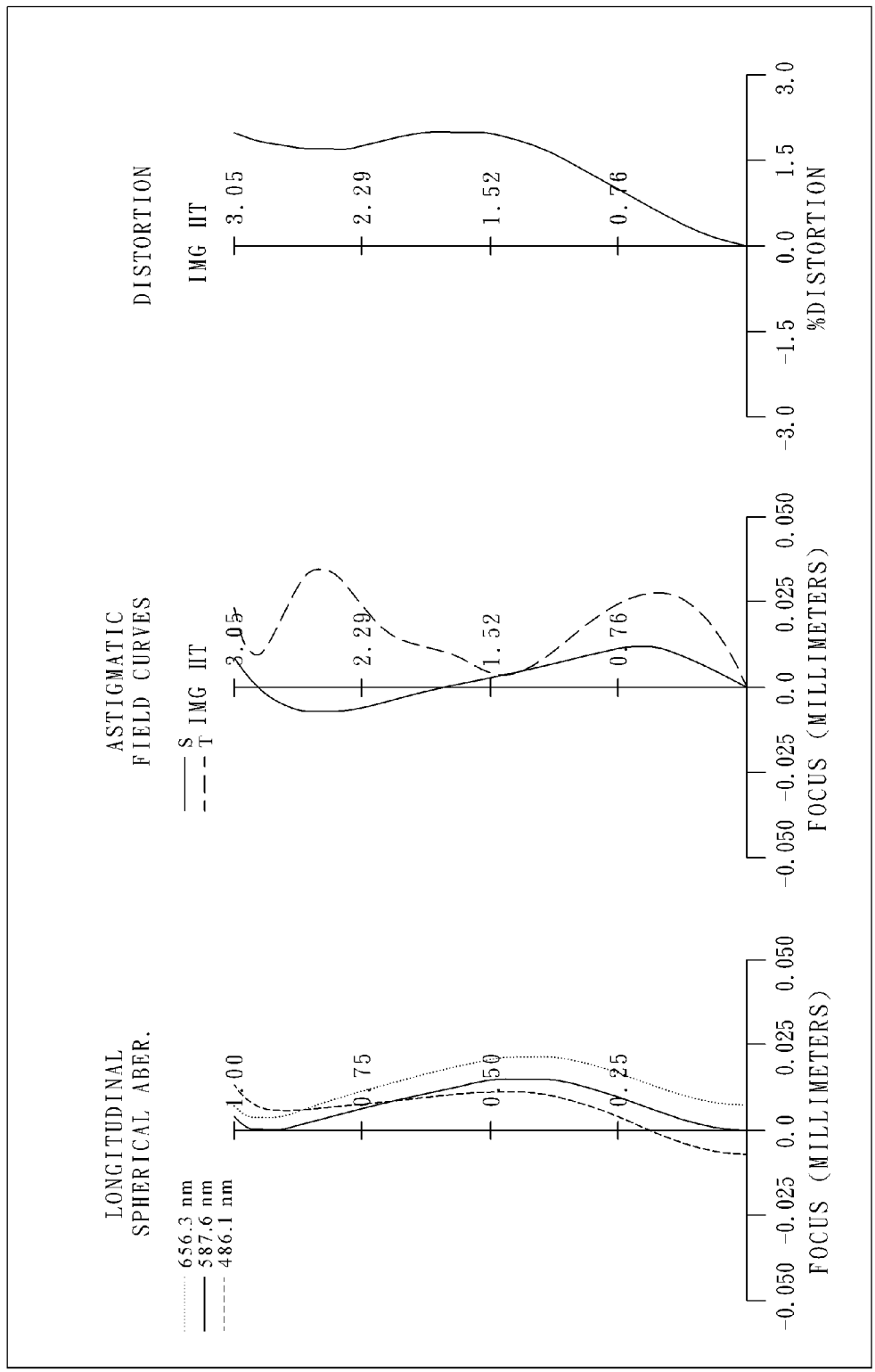
FIG. 9B shows spherical aberration curves, astigmatic field curves and a distortion curve of the image capturing system according to the 9th embodiment.

FIG. 9A is a schematic view of an image capturing system according to the 9th embodiment of the present disclosure. FIG. 9B shows spherical aberration curves, astigmatic field curves and a distortion curve of the image capturing system according to the 9th embodiment. In FIG. 9A, the image capturing system includes, in order from an object side to an image side, an aperture stop 900, a first lens element 910, a second lens element 920, a third lens element 930, a fourth lens element 940, a fifth lens element 950, an IR-cut filter 960 and an image plane 970, wherein the image capturing system has a total of five lens elements (910-950) with refractive power.

The first lens element 910 with positive refractive power has a convex object-side surface 911 at a paraxial region and a concave image-side surface 912 at a paraxial region, and is made of plastic material. The object-side surface 911 and the image-side surface 912 of the first lens element 910 are aspheric.

The second lens element 920 with negative refractive power has a convex object-side surface 921 at a paraxial region and a concave image-side surface 922 at a paraxial region, and is made of plastic material. The object-side surface 921 and the image-side surface 922 of the second lens element 920 are aspheric, wherein the shape of the object-side surface 921 of the second lens element 920 changes from convex at the paraxial region to concave at a peripheral region.

The third lens element 930 with positive refractive power has a concave object-side surface 931 at a paraxial region and a convex image-side surface 932 at a paraxial region, and is made of plastic material. The object-side surface 931 and the image-side surface 932 of the third lens element 930 are aspheric.

The fourth lens element 940 with negative refractive power has a concave object-side surface 941 at a paraxial region and a convex image-side surface 942 at a paraxial region, and is made of plastic material. The object-side surface 941 and the image-side surface 942 of the fourth lens element 940 are aspheric.

The fifth lens element 950 with positive refractive power has a convex object-side surface 951 at a paraxial region and a concave image-side surface 952 at a paraxial region, and is made of plastic material. The object-side surface 951 and the image-side surface 952 of the fifth lens element 950 are aspheric, wherein the shape of the image-side surface 952 of the fifth lens element 950 changes from concave at the paraxial region to convex at a peripheral region.

The IR-cut filter 960 is made of glass, and located between the fifth lens element 950 and the image plane 970, and will not affect the focal length of the image capturing system.

The detailed optical data of the 9th embodiment are shown in Table 17 and the aspheric surface data are shown in Table 18 below.

TABLE 17

9th Embodiment
f = 3.90 mm, Fno = 2.57, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.210 | | | | |
| 2 | Lens 1 | 1.485 | ASP | 0.479 | Plastic | 1.544 | 55.9 | 4.56 |
| 3 | | 3.279 | ASP | 0.299 | | | | |
| 4 | Lens 2 | 2.929 | ASP | 0.244 | Plastic | 1.650 | 21.4 | −9.56 |
| 5 | | 1.925 | ASP | 0.231 | | | | |
| 6 | Lens 3 | −100.000 | ASP | 0.504 | Plastic | 1.530 | 55.8 | 3.82 |
| 7 | | −1.989 | ASP | 0.308 | | | | |
| 8 | Lens 4 | −0.842 | ASP | 0.347 | Plastic | 1.650 | 21.4 | −6.17 |
| 9 | | −1.239 | ASP | 0.086 | | | | |
| 10 | Lens 5 | 1.511 | ASP | 0.759 | Plastic | 1.535 | 55.7 | 20.50 |
| 11 | | 1.446 | ASP | 0.600 | | | | |
| 12 | IR-cut filter | Plano | | 0.300 | Glass | 1.517 | 64.2 | — |
| 13 | | Plano | | 0.747 | | | | |
| 14 | Image | Plano | | — | | | | |

Note:
Reference wavelength (d-line) is 587.6 nm.

TABLE 18

Aspheric Coefficients

| Surface # | 2 | 3 | 4 | 5 | 6 |
|---|---|---|---|---|---|
| k = | −3.0704E+00 | −1.7292E+00 | −2.8343E+01 | 2.3034E+00 | −1.0000E+00 |
| A4 = | 1.3155E−01 | −1.5108E−02 | −1.0326E−01 | −2.3377E−01 | −3.4194E−02 |

TABLE 18-continued

| Aspheric Coefficients | | | | | |
|---|---|---|---|---|---|
| A6 = | -4.8704E-03 | -1.3431E-02 | -1.5879E-01 | 9.9852E-02 | -3.4206E-03 |
| A8 = | 2.0595E-02 | 1.3072E-01 | -2.2871E-02 | -3.3654E-01 | 1.2637E-01 |
| A10 = | -1.9156E-02 | -3.1193E-01 | 2.2353E-01 | 5.3987E-01 | -1.1683E-01 |
| A12 = | 7.1301E-02 | 3.3663E-01 | -2.7839E-01 | -4.6570E-01 | 4.1339E-02 |
| A14 = | -4.4187E-02 | -1.5745E-01 | 6.1069E-02 | 1.4141E-01 | -1.1989E-02 |

| Surface # | 7 | 8 | 9 | 10 | 11 |
|---|---|---|---|---|---|
| k = | -4.6367E+00 | -3.6086E+00 | -7.7992E+00 | -2.9213E+00 | -6.1262E-01 |
| A4 = | -1.0532E-01 | -1.7880E-02 | -3.5722E-01 | -4.0855E-01 | -2.7367E-01 |
| A6 = | -1.4602E-01 | -6.2089E-01 | 3.1716E-01 | 2.7596E-01 | 1.1584E-01 |
| A8 = | 4.2634E-01 | 1.5228E+00 | -1.4428E-01 | -1.5050E-01 | -4.3183E-02 |
| A10 = | -2.3166E-01 | -1.3455E+00 | 8.6303E-02 | 5.3101E-02 | 1.0623E-02 |
| A12 = | 3.2435E-02 | 5.4989E-01 | -3.6078E-02 | -9.0904E-03 | -1.6834E-03 |
| A14 = | 1.3579E-03 | -8.8708E-02 | 5.3696E-03 | 4.9514E-04 | 1.5562E-04 |
| A16 = | | | | 1.5456E-05 | -7.0435E-06 |

In the image capturing system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f [mm] | 3.90 | (T23 + T34 + T45)/CT5 | 0.82 |
|---|---|---|---|
| Fno | 2.57 | |SAG42/CT4| | 1.30 |
| HFOV [deg.] | 37.4 | (R5 + R6)/(R5 − R6) | 1.04 |
| (V2 + V4)/V1 | 0.77 | R8/f4 | 0.20 |
| T12/CT2 | 1.23 | f/f3 | 1.02 |
| T12/T34 | 0.97 | |f4/f5| | 0.30 |

10th Embodiment

Figure 10A:
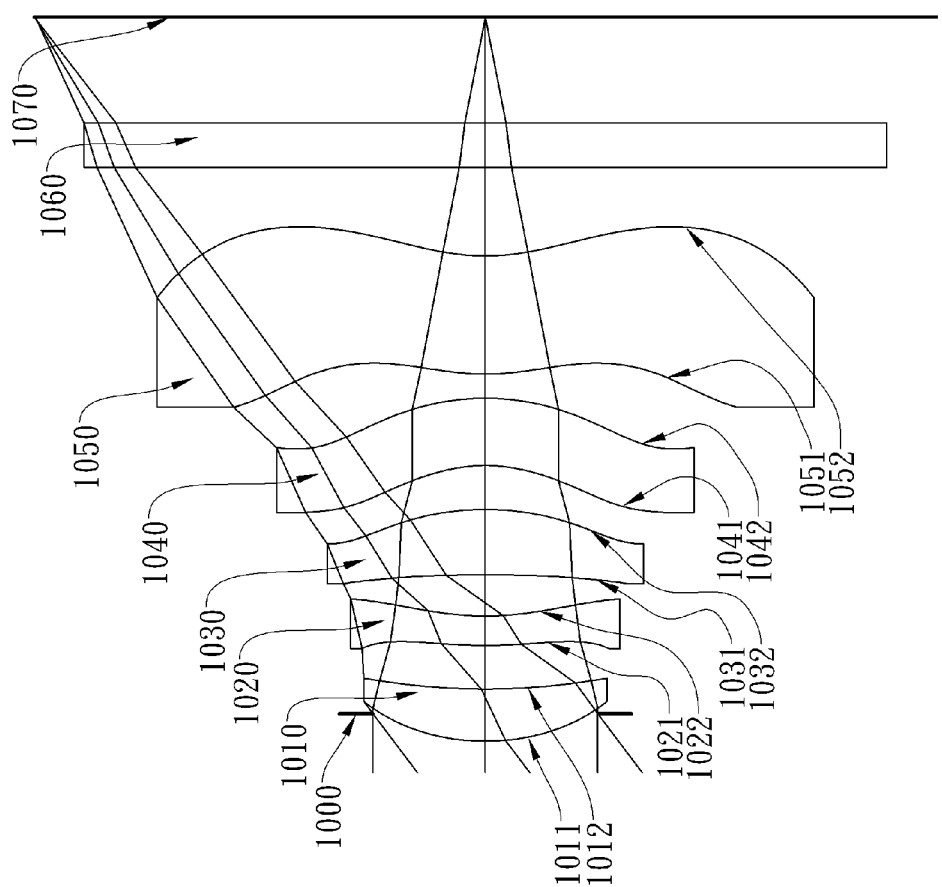
FIG. 10A is a schematic view of an image capturing system according to the 10th embodiment of the present disclosure.
Figure 10B:
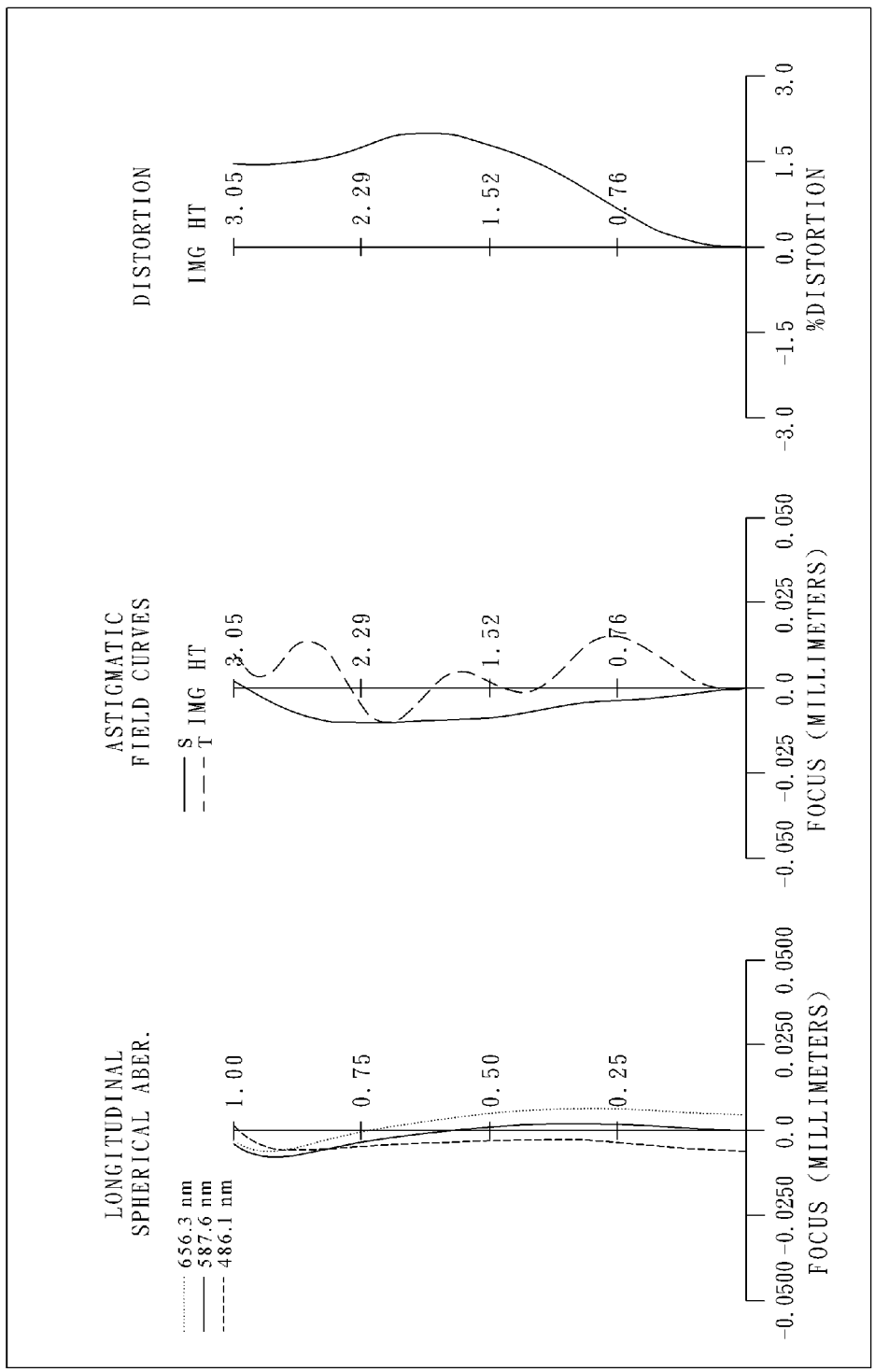
FIG. 10B shows spherical aberration curves, astigmatic field curves and a distortion curve of the image capturing system according to the 10th embodiment.

FIG. 10A is a schematic view of an image capturing system according to the 10th embodiment of the present disclosure. FIG. 10B shows spherical aberration curves, astigmatic field curves and a distortion curve of the image capturing system according to the 10th embodiment. In FIG. 10A, the image capturing system includes, in order from an object side to an image side, an aperture stop 1000, a first lens element 1010, a second lens element 1020, a third lens element 1030, a fourth lens element 1040, a fifth lens element 1050, an IR-cut filter 1060 and an image plane 1070, wherein the image capturing system has a total of five lens elements (1010-1050) with refractive power.

The first lens element 1010 with positive refractive power has a convex object-side surface 1011 at a paraxial region and a concave image-side surface 1012 at a paraxial region, and is made of plastic material. The object-side surface 1011 and the image-side surface 1012 of the first lens element 1010 are aspheric.

The second lens element 1020 with negative refractive power has a convex object-side surface 1021 at a paraxial region and a concave image-side surface 1022, at a paraxial region and is made of plastic material. The object-side surface 1021 and the image-side surface 1022 of the second lens element 1020 are aspheric, wherein the shape of the object-side surface 1021 of the second lens element 1020 changes from convex at the paraxial region to concave at a peripheral region.

The third lens element 1030 with positive refractive power has a concave object-side surface 1031 at a paraxial region and a convex image-side surface 1032 at a paraxial region, and is made of plastic material. The object-side surface 1031 and the image-side surface 1032 of the third lens element 1030 are aspheric.

The fourth lens element 1040 with negative refractive power has a concave object-side surface 1041 at a paraxial region and a convex image-side surface 1042 at a paraxial region, and is made of plastic material. The object-side surface 1041 and the image-side surface 1042 of the fourth lens element 1040 are aspheric.

The fifth lens element 1050 with positive refractive power has a convex object-side surface 1051 at a paraxial region and a concave image-side surface 1052 at a paraxial region, and is made of plastic material. The object-side surface 1051 and the image-side surface 1052 of the fifth lens element 1050 are aspheric, wherein the shape of the image-side surface 1052 of the fifth lens element 1050 changes from concave at the paraxial region to convex at a peripheral region.

The IR-cut filter 1060 is made of glass, and located between the fifth lens element 1050 and the image plane 1070, and will not affect the focal length of the image capturing system.

The detailed optical data of the 10th embodiment are shown in Table 19 and the aspheric surface data are shown in Table 20 below.

TABLE 19

10th Embodiment
f = 3.99 mm, Fno = 2.63, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | -0.187 | | | | |
| 2 | Lens 1 | 1.483 | ASP | 0.353 | Plastic | 1.544 | 55.9 | 4.00 |
| 3 | | 4.260 | ASP | 0.295 | | | | |
| 4 | Lens 2 | 2.935 | ASP | 0.200 | Plastic | 1.633 | 23.4 | -8.45 |

TABLE 19-continued

10th Embodiment
f = 3.99 mm, Fno = 2.63, HFOV = 37.0 deg.

| Surface # | | Curvature Radius | | Thickness | Material | Index | Abbe # | Focal Length |
|---|---|---|---|---|---|---|---|---|
| 5 | | 1.845 | ASP | 0.278 | | | | |
| 6 | Lens 3 | −14.895 | ASP | 0.444 | Plastic | 1.530 | 55.8 | 3.98 |
| 7 | | −1.868 | ASP | 0.298 | | | | |
| 8 | Lens 4 | −1.045 | ASP | 0.455 | Plastic | 1.633 | 23.4 | −5.94 |
| 9 | | −1.693 | ASP | 0.164 | | | | |
| 10 | Lens 5 | 1.621 | ASP | 0.800 | Plastic | 1.535 | 55.7 | 38.44 |
| 11 | | 1.456 | ASP | 0.600 | | | | |
| 12 | IR-cut filter | Plano | | 0.300 | Glass | 1.517 | 64.2 | — |
| 13 | | Plano | | 0.716 | | | | |
| 14 | Image | Plano | | — | | | | |

Note:
Reference wavelength (d-line) is 587.6 nm.

TABLE 20

Aspheric Coefficients

| Surface # | 2 | 3 | 4 | 5 | 6 |
|---|---|---|---|---|---|
| k = | −2.7811E+00 | −5.1688E+00 | −3.0000E+01 | 2.4580E+00 | −1.0000E+00 |
| A4 = | 1.2651E−01 | −1.7264E−02 | −1.4024E−01 | −2.9491E−01 | −5.1080E−02 |
| A6 = | −9.7804E−04 | 3.0386E−02 | −1.0495E−01 | 1.3420E−01 | −8.1513E−02 |
| A8 = | 7.9437E−02 | 4.4658E−02 | 1.3207E−02 | −2.8075E−01 | 2.3147E−01 |
| A10 = | −1.4948E−01 | −2.4022E−01 | 2.4760E−01 | 4.5301E−01 | −1.3609E−01 |
| A12 = | 2.3221E−01 | 3.9880E−01 | −5.5114E−01 | −5.3215E−01 | 6.0525E−02 |
| A14 = | −1.2312E−01 | −2.8924E−01 | 2.3396E−01 | 1.8587E−01 | −6.1159E−02 |

| Surface # | 7 | 8 | 9 | 10 | 11 |
|---|---|---|---|---|---|
| k = | −3.5848E+00 | −3.1576E+00 | −9.2635E+00 | −1.3087E+00 | −6.5742E−01 |
| A4 = | −4.2851E−02 | 1.2780E−01 | −2.6651E−01 | −4.2721E−01 | −2.6096E−01 |
| A6 = | −2.3292E−01 | −6.8325E−01 | 2.6078E−01 | 2.8283E−01 | 1.1632E−01 |
| A8 = | 4.7681E−01 | 1.4600E+00 | −1.3915E−01 | −1.5026E−01 | −4.4594E−02 |
| A10 = | −2.0759E−01 | −1.3191E+00 | 8.8330E−02 | 5.2100E−02 | 1.1134E−02 |
| A12 = | −2.1960E−03 | 5.7075E−01 | −3.6286E−02 | −9.1456E−03 | −1.7406E−03 |
| A14 = | 9.7445E−03 | −9.9386E−02 | 5.4260E−03 | 5.6385E−04 | 1.5193E−04 |
| A16 = | | | | 1.0068E−05 | −5.8802E−06 |

In the image capturing system according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f [mm] | 3.99 | (T23 + T34 + T45)/CT5 | 0.93 |
|---|---|---|---|
| Fno | 2.63 | |SAG42/CT4| | 0.74 |
| HFOV [deg.] | 37.0 | (R5 + R6)/(R5 − R6) | 1.29 |
| (V2 + V4)/V1 | 0.84 | R8/f4 | 0.29 |
| T12/CT2 | 1.48 | f/f3 | 1.00 |
| T12/T34 | 0.99 | |f4/f5| | 0.15 |

It is to be noted that TABLES 1-20 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An image capturing system comprising, in order from an object side to an image side:
a first lens element with positive refractive power having a convex object-side surface at a paraxial region;
a second lens element having refractive power;
a third lens element having refractive power;
a fourth lens element with negative refractive power having a concave object-side surface at a paraxial region and a convex image-side surface at a paraxial region; and
a fifth lens element with refractive power having a concave image-side surface at a paraxial region, wherein an object-side surface and the image-side surface of the fifth lens element are aspheric, and the shape of the image-side surface of the fifth lens element changes from concave at the paraxial region to convex at a peripheral region;
wherein the image capturing system has a total of five lens elements with refractive power, an axial distance between the first lens element and the second lens element is T12, a central thickness of the second lens element is CT2, an axial distance between the third lens element and the fourth lens element is T34, a focal length of the fourth lens element is f4, a focal length of the fifth lens element is f5, and the following relationships are satisfied:

$1.08 < T12/CT2 < 3.0;$ $1.08 < T12/T34 < 3.0;$ and $0 < |f4/f5| < 0.50.$

2. The image capturing system of claim 1, wherein the third lens element has a convex image-side surface at a paraxial region.

3. The image capturing system of claim 2, wherein the object-side surface of the fifth lens element is convex at a paraxial region.

4. The image capturing system of claim 3, wherein the second lens element has negative refractive power.

5. The image capturing system of claim 3, wherein the first lens element has a concave image-side surface at a paraxial region.

6. The image capturing system of claim 3, wherein a focal length of the image capturing system is f, a focal length of the third lens element is f3, and the following relationship is satisfied:

$0.7 < f/f3 < 1.7.$

7. The image capturing system of claim 3, wherein an axial distance between the first lens element and the second lens element is T12, a central thickness of the second lens element is CT2, and the following relationship is satisfied:

$1.2 < T12/CT2 < 2.0.$

8. The image capturing system of claim 2, wherein the second lens element has a convex object-side surface at a paraxial region and a concave image-side surface at a paraxial region.

9. The image capturing system of claim 8, wherein the third lens element has positive refractive power, a curvature radius of the object-side surface of the third lens element is R5, a curvature radius of the image-side surface of the third lens element is R6, and the following relationship is satisfied:

$0.5 < (R5+R6)/(R5-R6) < 2.0.$

10. The image capturing system of claim 8, wherein the object-side surface of the second lens element is convex at a paraxial region, and the shape of the object-side surface of the second lens element changes from convex at the paraxial region to concave at a peripheral region.

11. The image capturing system of claim 2, wherein a curvature radius of the image-side surface of the fourth lens element is R8, the focal length of the fourth lens element is f4, and the following relationship is satisfied:

$0 < R8/f4 < 0.8.$

12. The image capturing system of claim 11, wherein an axial distance between the second lens element and the third lens element is T23, the axial distance between the third lens element and the fourth lens element is T34, an axial distance between the fourth lens element and the fifth lens element is T45, a central thickness of the fifth lens element is CT5, and the following relationship is satisfied:

$0.30 < (T23+T34+T45)/CT5 < 0.85.$

13. The image capturing system of claim 11, wherein an Abbe number of the second lens element is V2, an Abbe number of the fourth lens element is V4, an Abbe number of the first lens element is V1, and the following relationship is satisfied:

$0.6 < (V2+V4)/V1 < 1.0.$

14. The image capturing system of claim 11, wherein a distance in parallel with an optical axis from a maximum effective diameter position on the image-side surface of the fourth lens element to an axial vertex on the image-side surface of the fourth lens element is SAG42, a central thickness of the fourth lens element is CT4, and the following relationship is satisfied:

$0.6 < |SAG42/CT4| < 1.3.$

15. The image capturing system of claim 2, further comprising:
a shutter located between the first lens element and the second lens element.

16. An image capturing system comprising, in order from an object side to an image side:
a first lens element with positive refractive power having a convex object-side surface at a paraxial region;
a second lens element having refractive power;
a third lens element having refractive power;
a fourth lens element with negative refractive power having a concave object-side surface at a paraxial region and a convex image-side surface at a paraxial region; and
a fifth lens element with refractive power having a concave image-side surface at a paraxial region, wherein an object-side surface and the image-side surface of the fifth lens element are aspheric, and the shape of the image-side surface of the fifth lens element changes from concave at the paraxial region to convex at a peripheral region;
wherein the image capturing system has a total of five lens elements with refractive power, an axial distance between the first lens element and the second lens element is T12, a central thickness of the second lens element is CT2, an axial distance between the third lens element and the fourth lens element is T34, a focal length of the fourth lens element is f4, a focal length of the fifth lens element is f5, a distance in parallel with an optical axis from a maximum effective diameter position on the image-side surface of the fourth lens element to an axial vertex on the image-side surface of the fourth lens element is SAG42, a central thickness of the fourth lens element is CT4, and the following relationships are satisfied:

$1.08 < T12/CT2 < 3.0;$ $0.85 < T12/T34 < 3.0;$ $0 < |f4/f5| < 0.50;$ and $0.6 < |SAG42/CT4| < 1.3.$ 17. The image capturing system of claim 16, wherein the third lens element has positive refractive power, a curvature radius of the object-side surface of the third lens element is R5, a curvature radius of the image-side surface of the third lens element is R6, and the following relationship is satisfied:

$0.5 < (R5+R6)/(R5-R6) < 2.0.$

18. The image capturing system of claim 17, wherein a curvature radius of the image-side surface of the fourth lens element is R8, the focal length of the fourth lens element is f4, and the following relationship is satisfied:

$0 < R8/f4 < 0.8.$

19. The image capturing system of claim 17, wherein the axial distance between the first lens element and the second lens element is T12, the central thickness of the second lens element is CT2, and the following relationship is satisfied:

$1.2 < T12/CT2 < 2.0.$

20. The image capturing system of claim 17, wherein the second lens element has a convex object-side surface at a paraxial region and a concave image-side surface at a paraxial region.

21. The image capturing system of claim 20, wherein the object-side surface of the second lens element is convex at a paraxial region, and the shape of the object-side surface of the second lens element changes from convex at the paraxial region to concave at a peripheral region.

* * * * *